(12) United States Patent
Keusgen et al.

(10) Patent No.: US 9,647,809 B2
(45) Date of Patent: May 9, 2017

(54) METHOD FOR SPREADING A PLURALITY OF DATA SYMBOLS ONTO SUBCARRIERS OF A CARRIER SIGNAL

(71) Applicant: Fraunhofer-Gesellschaft zur Foerderung der angewandten Forschung e.V., Munich (DE)

(72) Inventors: Wilhelm Keusgen, Berlin (DE); Michael Peter, Berlin (DE); Andreas Kortke, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/565,609

(22) Filed: Dec. 10, 2014

(65) Prior Publication Data

US 2015/0092872 A1    Apr. 2, 2015

Related U.S. Application Data

(63) Continuation of application No. PCT/EP2013/062414, filed on Jun. 14, 2013.

(30) Foreign Application Priority Data

Jun. 15, 2012 (EP) .................................. 12172212

(51) Int. Cl.
*H04B 1/00* (2006.01)
*H04L 27/00* (2006.01)
(Continued)

(52) U.S. Cl.
CPC ............. *H04L 5/0044* (2013.01); *H04B 1/69* (2013.01); *H04B 1/71632* (2013.01);
(Continued)

(58) Field of Classification Search
CPC .......... H04B 1/69; H04B 1/713; H04B 1/709; H04B 1/7176; H04B 1/7183;
(Continued)

(56) References Cited

U.S. PATENT DOCUMENTS 4,597,450 A * 7/1986 Budmiger ................ A62C 8/06
169/49
6,778,910 B1 * 8/2004 Vidal ................ G01N 15/1459
702/187

(Continued)

OTHER PUBLICATIONS

Al-Mahmoud, M. et al., "Peformance Evaluation of Code-Spread OFDM", 46th Annual Allerton Conference, Sep. 23-26, 2008, pp. 274-278.

(Continued)

*Primary Examiner* — Daniel Washburn
*Assistant Examiner* — Sarah Hassan
(74) *Attorney, Agent, or Firm* — Keating & Bennett, LLP

(57) ABSTRACT

A method for spreading a plurality of data symbols onto subcarriers of a carrier signal for a transmission in a transmission system provides a data vector, including the plurality of data symbols. The provided data vector is transformed, and based on the transformed data vector and a spreading matrix subsequent to the transform, a spread data vector is being created, having a length which corresponds to the number of the subcarriers.

21 Claims, 8 Drawing Sheets

(51) Int. Cl.
- *H04L 5/00* (2006.01)
- *H04B 1/7163* (2011.01)
- *H04B 1/69* (2011.01)
- *H04L 27/26* (2006.01)

(52) U.S. Cl.
CPC ........ *H04L 5/0021* (2013.01); *H04L 27/2601* (2013.01); *H04L 27/2634* (2013.01)

(58) Field of Classification Search
CPC   H04B 1/7093; H04B 1/7097; H04B 1/71632; H04B 1/71637; H04B 1/7172; H04B 2201/70707
USPC .................................. 375/148, 259; 702/187
See application file for complete search history.

(56) References Cited

U.S. PATENT DOCUMENTS

| | | | | |
|---|---|---|---|---|
| 7,031,371 | B1* | 4/2006 | Lakkis | H04B 1/71635 375/130 |
| 2001/0001616 | A1* | 5/2001 | Rakib | H03M 13/256 375/259 |
| 2002/0118635 | A1* | 8/2002 | Nee | 370/210 |
| 2002/0136277 | A1* | 9/2002 | Reed | H04B 1/7105 375/148 |
| 2003/0147455 | A1* | 8/2003 | Simoni | H04B 1/7105 375/148 |
| 2005/0020215 | A1* | 1/2005 | Hottinen | H04B 7/0615 455/101 |
| 2006/0274708 | A1* | 12/2006 | Estraviz et al. | 370/342 |
| 2007/0268977 | A1* | 11/2007 | Wang | H04L 5/0007 375/261 |
| 2008/0291821 | A1* | 11/2008 | Dent | H04B 1/7097 370/210 |
| 2010/0054211 | A1* | 3/2010 | Gaal | 370/335 |
| 2010/0129357 | A1* | 5/2010 | Garcia-Martinez | A61K 39/39533 424/133.1 |
| 2011/0286497 | A1* | 11/2011 | Nervig | 375/147 |

OTHER PUBLICATIONS

Nangia, V. et al., "Experimental Broadband OFDM System: Field Results for OFDM and OFDM with Frequency Domain Spreading", IEEE 56th Vehicular Technology Conference, 2002, pp. 223-227.
Al-Mahmoud, M. et al., "Performance Evaluation of Code-Spread OFDM Using Vandermonde Spreading", IEEE Radio and Wireless Symposium, 2009, pp. 320-323.
Bury, A. et al., "Diversity Comparison of Spreading Transforms for Multicarrier Spread Spectrum Transmission" IEEE Transactions on Communications, vol. 51, No. 5, May 2003, pp. 774-781.
http://chaos.if.uj.edu.pl/~karol/hadamard/. 2015. 2 pages.
Frank, R. et al., "Phase Shift Pulse Codes with Good Periodic Correlation Properties", IRE Transactions on Information Theory, vol. 8, 1962, pp. 381-382.
Lüke H. et al., "Correlation Signals", Correlation Sequences and Correlation Arrays in Telecommunications and Information Technology, Measurement Technology and Optics, Springer-Verlag, 1992, 54 pages.
Lüke H. et al., "Binary and Quadriphase Sequences with Optimal Autocorrelation Properties: A Survey", IEEE Transactions on Information Theory, vol. 49, No. 12, 2003, pp. 3271-3282.
Schotten H., "New Optimum Ternary Complementary Sets and Almost Quadriphase Perfect Sequences", International Conference on Neural Networks and Signal Processing, vol. 2, 1995, p. 1105-1109.
Schotten H., "Optimum Complementary Sets and Quadriphase Sequences Derived from q-ary m-Sequences", IEEE International Symposium on Information Theory, 1997, pp. 485.
Schroeder M., "Number Theory in Science and Communication", Springer-Verlag, 1989, pp. 174-177 and 182-185.
Boehmer A., "Binary Pulse Compression Codes", IEEE Transactions on Information Theory, vol. 13, No. 2, Apr. 1967, pp. 156-167.
Lempel A., "A Class of Balanced Binary Sequences with Optimal Autocorrelation Properties", IEEE Transactions on Information Theory, vol. 23, No. 1, Jan. 1997, pp. 38-42.
Golomb S. et al., "Digital Communications: With Space Applications", Prentice Hall, 1964, 2 pages.
Gohberg I. et al., "Fast Algorithms with Preprocessing for Matrix-Vector Multiplication Problems", Journal of Complexity, vol. 10, No. 4, 1994, pp. 1-5.
Golub G. et al., "Matrix Computations", The Johns Hopkins University Press, 3rd Edition, 1996, pp. 188-193.
Chu D., "Polyphase Codes with Good Periodic Correlation Properties", IEEE Transactions on Information Theory, vol. 18, 1972, pp. 531-532.
McCloud M., "Analysis and Design of Short Block OFDM Spreading Matrices for Use on Multipath Fading Channels", IEEE Transactions on Communications, vol. 53, No. 4, Apr. 2005, pp. 656-665.
Raad I. et al., "Analytical Study of the Rotation Spreading Matrix of Block Spread OFDM with MMSE Equalization", 3rd International Conference on Information and Communication Technologies: From Theory to Applications, Apr. 7, 2008, pp. 1-5.
Serener, A. et al., "Performance of Spread OFDM with LDPC Coding in Outdoor Environments", IEEE 58th Vehicular Technology Conference, VTC-Fall, 2003, pp. 318-321.
Galda, D. et al., "A Low Complexity Transmitter Structure for OFDM-FDMA Uplink Systems", 55th Vehicular Technology Conference, VTC-Spring, 2002, pp. 1-5.
Aldalgamouni, T. et al., "Optimized Resource Allocation for the Uplink of SFBC-CDMA Systems", IEEE, 2008, pp. 478-483.
Shah, S., et al., "Design and Analysis of Post-Coded OFDM Systems", IEEE Transactions on Wireless Communications, vol. 7, No. 12, Dec. 2008, pp. 4907-4918.
Official Communication issued in corresponding International Application PCT/EP2013/062414, mailed on Oct. 2, 2013.
Official Communication issued in corresponding International Application PCT/EP2013/062414, mailed on Oct. 20, 2014.

* cited by examiner

METHOD FOR SPREADING A PLURALITY OF DATA SYMBOLS ONTO SUBCARRIERS OF A CARRIER SIGNAL

CROSS-REFERENCE TO RELATED APPLICATIONS

This application is a continuation of copending International Application No. PCT/EP2013/062414, filed Jun. 14, 2013, which is incorporated herein by reference in its entirety, and additionally claims priority from European Application No. 12172212.8, filed Jun. 15, 2012, which is also incorporated herein by reference in their entirety.

The present invention relates to approaches for spreading/de-spreading of a plurality of data symbols onto subcarriers of a carrier signal, particularly novel spreading methods for utilization of frequency diversity in multiple carrier transmission systems.

BACKGROUND OF THE INVENTION

The orthogonal frequency-division multiplexing method (OFDM) has established itself in many areas for high-rate data transmission in radio systems with large bandwidth. It is used, for example, in digital audio broadcasting (DAB), digital video broadcasting—terrestrial (DVB-T), in wireless local area networks (WLAN) and 4G long term evolution LTE. The principle of OFDM consists of splitting the high-rate overall data stream into many low-rate data streams and transmitting them parallel via the corresponding number of orthogonal subcarriers. Compared to single-carrier methods, various advantages result for transmission via frequency selective multipath channels. In doing so, channel equalization can be implemented efficiently in the frequency range without using costly adaptive equalization filters. Furthermore, by introducing a guard interval (GI) between the OFDM symbols, inter-symbol interference (ISI) can be effectively prevented. Signal generation can be realized with the help of inverse discrete Fourier transform (IDFT) or its expense-favorable implementation, the inverse fast Fourier transform (IFFT).

An almost identical method is also used for line-tied transmission. It is known as "discrete multitone transmission" (DMT). It is used, for example, for broadband digital data transmission via subscriber connection lines (DSL). Because DMT can also be viewed as a form of OFDM, the term "OFDM" will be used for both module types, hereafter. Thus, the following remarks similarly refer to DMT systems.

One problem with the transmission via channels with distinct multi-path dispersion (e.g. by means of signals reflected at buildings during radio transmission or reflection onto lines during line-tied transmission) is that destructive interference can cause erasing of subcarriers ("spectral zeros") in the channel). Because the symbols modulated onto the affected subcarriers cannot be detected correctly by the receiver, any longer, this causes a high symbol error rate (SER) or a high bit error rate (BER) in the data stream, which only slightly decreases with increasing signal to noise ratio (SNR). Thus, it cannot readily be compensated for by increasing the transmission capacity.

As a matter of principle, the problem can be avoided if the transmitter only modulates the data to the strong subcarriers and omits the weak or deleted subcarriers. This involves, however, that it knows the actual radio channel to the receiver (channel state information at transmitter's), which is not the case in many systems. The reasons for this are, for example, the higher complexity of the system connected therewith, and feedback information that may be used (transmission of channel information from receiver to transmitter), which cause a transmission overhead and have to be made available to transmitter with very little delay for a fast time-variable channel.

Generally, OFDM is coupled with forward error correction (FEC), which results in coded OFDM (COFDM). To do this, targeted redundancy is added to the sent data stream by means of suitable channel coding and used at receiver's to correct transmission errors. By means of FEC, BER can be significantly reduced, whereby the net data rate is decreased by the added redundancy—a defaulted net data rate entails correspondingly increased transmission resources. A linked FEC is oftentimes implemented in classic COFDM systems, where a convolution code is linked as inner code and a block code (e.g. Reed Solomon Code) is linked as outer code, for example. The inner code has the primary task to reduce the effects of the weak subcarriers or the spectral zeros. With the help of the outer code, the error rate is further reduced by several decimal powers.

One alternative to compensate for the influence of weak subcarriers is to spread data symbols prior to OFDM modulation in the frequency range. Every symbol is then no longer transmitted via a single but via all subcarriers, via which the spreading operation is being implemented. Any sub-carrier carries a linear combination of all transmission symbols within the block. Even in case of loss of several subcarriers, it is often times still possible to reconstruct the transmission symbols, and the BER strongly decreases around the operating point (as in the non-frequency selective case) with increasing SNR. This is referred to as diversity gain. The method is referred to as "code-spread OFDM" (CS-OFDM; see reference [1]—the stated references can be found in detail in Appendix 1 to this description), "spread OFDM" (SOFDM; see reference [2]) or "frequency domain spreading" (see reference [3]). The abbreviation CS-OFDM will be used, hereafter. Classically, M modulation symbols are spread onto/over N subcarriers, causing no loss in data rate. If M<N modulation symbols are spread onto N subcarriers, the system is referred to as "partially loaded" (PL) (PL CS-OFDM; see reference [1]). By means of partial load, further gains can be achieved at the expense of the data rate.

Compared to COFDM systems, no redundancy has to be added to CS-OFDM systems to utilize frequency diversity. An additional FEC with the help of channel coding is, however, generally reasonable to further reduce the error rate. Because the channel code used in such case, does not have to compensate for the influence of the weak subcarriers any longer, the code rate can turn out larger for classic coding methods in connection with the spreading.

CS-OFDM signals have unfavorable signal statistics, in common with OFDM signals. Interference of a plurality of subcarriers results in a poor ratio of instant performance to mean signal performance (signal statistics). This is often times indicated by the peak-to-average power ratio (PAPR), the ratio of maximum instant performance to mean signal performance or the crest factor (ratio of the maximum instant value to the root mean square value of the signal). The measurements take on high values for OFDM signals. Signal statistics deteriorates with increasing subcarrier number N.

High requirements to the linearity of the components used in the system, and especially to the power amplifiers, result from poor signal statistics. Therefore, such components can often times only be operated in an inefficient operating point. One problem for the PL CS-OFDM is the fact that the PAPR—in comparison to the fully loaded system—can drastically continue to deteriorate.

The presentation of the problem in respect to a CS-OFDM system is the realization of an efficient, adaptive transmission by means of an implementation with low complexity:

high performance ability: good utilization of the frequency diversity of the frequency selective channel, low bit error rate with given SNR and given net data rate good signal statistics (low PAPR): low requirements to the linearity of the analog hardware (above all at the power amplifiers) and performance specific operating point high adaptivity: adaptivity possibility of the transmission (robustness, net data rate, redundancy) to the conditions of the transmission channel with low complexity and fine tuning implementation with low complexity: low utilization of resources of digital signal processing and low requirements to the speed of digital signal processing, cost and performance efficient implementation Generally, the criteria cannot be optimized independently from another. Conventional technology knows several spreading methods with good properties, which will be described, hereafter.

Conventional technology describes Hadamard (also termed "Walsh-Hadamard" or "Hadamard-Walsh"; see references [1]-[4] and [5]), DFT (see references [3], [5]) as well as Vandermonde spreading (see reference [4]). These spreading methods are characterized by high performance ability. This applies at least to large spreading lengths, that is, if the spreading is being implemented by means of a high number of subcarriers. Modifications of the Hadamard transform and the discrete Fourier transform (DFT), the "rotated" Hadamard transform and the "rotated" DFT are suggested in reference [5] to improve performance ability for low spreading lengths.

An increase of CS-OFDM is introduced in references [1], [4]. It consists of feeding a low number of modulation symbols into the spreading operation, which are available as subcarriers, that is, in spreading M symbols onto N subcarriers, where M<N. The system is then referred to as "partially loaded" (PL CS-OFDM). The classic case, a fully loaded system, exists for M=N. Reference [1] suggests the use of PL CS-OFDM to realize further gains compared to OFDM and CS-OFDM, at the expense of the data rate.

For DFT spreading, recourse can be made to the fast Fourier transform (FFT), that is, an efficient algorithm for calculation of the discrete Fourier transform (DFT). The complexity amounts to O (N log$^2$ (N)), with multiplications with the root of unity and additions being performed. The Vandermonde spreading, a multiplication of a Vandermonde matrix of the dimension N×N with a symbol vector of the length N, can be realized with the complexity O (N log$^2$ (N)) (multiplications and additions; see reference [17]). Hadamard spreading can be implemented with the help of the fast Walsh-Hadamard transform (FWHT). It involves N log (N) additions or subtractions and thus has the lowest computational complexity among the methods with full flexibility (fine-tuned partial load, selection of the carriers).

An implementation of the DFT spreading with particularly low complexity is described in reference [16]. In doing so, the multiple carrier system is reduced back to a single carrier system, so that the transmitter can be realized very easily, which, however, is not similarly applicable to the receiver in case a channel estimation and a channel equalization have to be implemented. Furthermore, the system is no longer fully flexible with respect to the partial load with full diversity and selection of the allocated subcarriers.

FIG. 1 shows a block diagram by means of which signal processing is explained in a conventional CS-OFDM transmitter. By means of an introduction, it should be noted that the mathematical notation used in this description is explained in Appendix 2 to this description. The matrices and sequences, to which reference is being made, are explained, there, as well. For better understanding, cross references to the sections of Appendix 2 are indicated at several locations. The abbreviations used are listed in Appendix 3 to this description.

FIG. 1 shows a processing chain 100 for generation of the spread OFDM signal. Mathematically, this can be illustrated with the help of vectors, matrices and corresponding operations. The stream of the (already coded, where applicable) data symbols $d_s$ is transformed with the help of a serial/parallel converter 102 in data vectors d of the length M. Spreading is being implemented at block 104. The type of spreading is entirely described by the spreading matrix D. Subsequently, the spread data vectors x are fed to IDFT 106. Blocks 104 and 106 can be combined in one block 108, which implements both the spreading and the IDFT. The combination of both operations is hereafter referred to as "overall transform", and block 108, which implements such transform, as "overall transformer". The transforming output vectors w can then be submitted to further operations in the digital baseband (e.g. inserting a Guard interval, fenestration). By means of a digital/analog converter, they are converted to analog signals and run through the typical processing chain of a transmitter for digital data processing, until emission via the antenna(s).

Mathematically, the spread data vector x results from a vector matrix multiplication of the spreading matrix D (dimension N×M) with the input vector d (length M, column vector):

$$x=Dd.$$

IDFT 106 can be illustrated as multiplication with the IDFT matrix $F^{-1}$ (see section 2.10 of Appendix 2) of the dimension N×N. We have:

$$w=F^{-1}x$$

and consequently $$w=F^{-1}Dd=:Bd,$$

with the multiplication of vector d with the matrix $B=F^{-1}D$ illustrating the overall transform 108.

The spreading methods known in the art (see, for example, references [1]-[5]) can be characterized by means of matrices, in particular Hadamard, Vandermonde, and DFT matrices, (see definitions in sections 2.8, 2.9 and 2.10 of Appendix 2). With a full load of the system (M=N), D is identical to the characterizing matrix. With a partial load (M<N), a partial block or sub-block of the characterizing N×N matrix is used for D, which block consists of the first M matrix columns (see references [1], [4]). Spreading methods, which are based on a spreading matrix, are referred to as matrix-based spreading methods, hereafter.

SUMMARY

According to an embodiment, a method for spreading a plurality of data symbols onto subcarriers of a carrier signal for a transmission in a transmission system may have the steps of: providing a data vector, including the plurality of data symbols; performing a spreading allocation of the data vector using a spreading allocation matrix to deliver a vector exhibiting a length which corresponds to the number of subcarriers, transforming, by a transformer, the delivered vector; and after transforming the delivered vector, creating a spread data vector based on the transformed data vector and a spreading matrix, wherein the spread data vector exhibiting a length which corresponds to the number of subcarriers, wherein the spreading allocation assigns the data symbols in the data vector to the inputs of a transformer.

According to another embodiment, a method for de-spreading of a signal being transmitted in a transmission system, which includes a plurality of data symbols, which were spread onto subcarriers of a carrier signal by means of a method according to claim 1, may have the steps of: providing a receive vector of the length N, which includes the data symbols; and despreading the provided receive vector by means of de-spreading the receive vector, and applying an inverse spreading allocation matrix for selecting a symbol vector of the length M.

Another embodiment may have a computer program including a program code for implementing the method according to claim 1, if the program code runs on a computer or processor.

Another embodiment may have a computer program including a program code for implementing the method according to claim 14, if the program code runs on a computer or processor.

Another embodiment may have an apparatus for spreading a plurality of data symbols onto subcarriers of a carrier signal for a transmission in a transmission system, with a processor, which is adapted to implement a method according to claim 1.

Another embodiment may have an apparatus for de-spreading a signal being transmitted in a transmission system, which includes a plurality of data symbols, which were spread onto subcarriers of a carrier signal by means of an apparatus according to claim 19, with a processor, which is adapted to implement a method according to claim 14.

According to another embodiment, a transmission system may have: a transmitter, which includes an apparatus for spreading according to claim 19; and a receiver, which includes an apparatus for de-spreading according to claim 20.

(First Aspect)

According to a first aspect, the present invention provides a method for spreading a plurality of data symbols onto subcarriers of a carrier signal for a transmission in a transmission system, with the following steps:
  providing a data vector, comprising the plurality of data symbols; and
  creating a spread data vector based on the provided data vector and a spreading matrix, with the spread data vector having a length which corresponds to the number of subcarriers,
  with the spreading matrix comprising at least one of the following matrix: a circulant base spreading matrix, a randomization matrix, a modified block spreading allocation matrix.

According to one embodiment, the modified block spreading allocation matrix describes the allocation of the plurality of data symbols to inputs of a base spreading module, which operates based on the base spreading matrix.

According to one embodiment, the modified block spreading allocation matrix contains the elements 1 and 0, where:

$$\sum_{m=1}^{M}[T]_{nm} \in \{0,1\} \forall n=1\ldots N,$$

so that any of the N parallel inputs of the base spreading module are only allocated one-fold, and $$\sum_{n=1}^{N}[T]_{nm} > 0 \forall m=1\ldots M,$$

so that all M data symbols are taken into consideration for the base spreading, with:
M number of data symbols, and
N number of subcarriers.

According to one embodiment, $\sum_{n=1}^{N}[T]_{nm}=1 \forall m=1\ldots M$ is true for the modified block spreading matrix.

According to one embodiment, the modified block spreading matrix results from an auxiliary matrix, as follows:

$$T_{rake} = \begin{pmatrix} T_h \\ 0_{(N-\lfloor \frac{N}{M} \rfloor \cdot M), M} \end{pmatrix}$$

with the auxiliary matrix being defined as follows:

$$T_h = I_M \otimes \begin{pmatrix} 1 \\ 0_{(\lfloor \frac{N}{M} \rfloor -1),1} \end{pmatrix}$$

with:
I unit matrix, and
0 zero matrix

According to one embodiment, the modified block spreading allocation matrix comprises a cyclically shifted matrix, which—assuming that $$T_{block/rake} = \begin{pmatrix} t_{0,0} & t_{0,1} & \cdots & t_{0,M-1} \\ t_{1,0} & t_{1,1} & \cdots & t_{1,M-1} \\ \vdots & \vdots & \ddots & \vdots \\ t_{N-1,0} & t_{N-1,1} & \cdots & t_{N-1,M-1} \end{pmatrix}$$

—results in a cyclically shifted matrix by k elements, as follows:

$$\tilde{T}_{block/rake,k} = \begin{pmatrix} t_{((0-k)modN),0} & t_{((0-k)modN),1} & \cdots & t_{((0-k)modN),M-1} \\ t_{((1-k)modN),0} & t_{((1-k)modN),1} & \cdots & t_{((1-k)modN),M-1} \\ \vdots & \vdots & \ddots & \vdots \\ t_{((N-1-k)modN),0} & t_{((N-1-k)modN),1} & \cdots & t_{((N-1-k)modN),M-1} \end{pmatrix}$$

According to one embodiment—in support of K users of the transmission system—one user-specified modified block spreading allocation matrix respectively allocated to a user k is used, where also:

$$\sum_{k=1}^{K}\sum_{m=1}^{M}[T_k]_{nm}\in\{0,1\}\forall n=1\ldots N,$$

so that any of the N parallel inputs of the base spreading module is only allocated one-fold in case of multiple users.

According to one embodiment, the base spreading matrix comprises a regular matrix.

According to one embodiment, the base spreading matrix comprises a Hadamard matrix with elements from $\{1,-1\}$, a Vandermonde matrix, or a DFT matrix.

According to one embodiment, the base spreading matrix comprises a circulant base spreading matrix, which is described by means of the vector in the first column, which indicates a spreading sequence.

According to one embodiment, $|c_n|=C \forall n=1\ldots N, C\epsilon R_+^*$; and $CC^H=C^HC=A\cdot I, A\epsilon R_+^*$ is true for the circulant base spreading matrix.

According to one embodiment, the spreading sequence of the circulant base spreading matrix comprises a sequence with perfect or good periodic auto correlation function, wherein the sequence can be one of the following sequences:
(1) a Frank sequence,
(2) a Frank-Zadoff-Chu sequence,
(3) a sequence, which results from the sequences (1) and (2) by means of an invariance operation.

According to one embodiment, the spreading sequence of the circulant base spreading matrix is derived from a Fourier-transformed base sequence.

According to one embodiment, the spreading sequence results from the base sequence $s=(s_1, s_2, \ldots, s_N)^T$ by means of DFT: $c_{DFT}=\text{DFT}(s)=Fs$, or by means of IDFT: $c_{IDFT}=\text{IDFT}(s)=F^{-1}s$.

According to one embodiment, the base sequence comprises a sequence with perfect or good periodic auto correlation function, wherein the sequence can be one of the following sequences:
(1) a Frank sequence,
(2) a Frank-Zadoff-Chu sequence,
(3) a binary m-sequence,
(4) a binary Legendre sequence,
(5) a binary generalized Sidelnikov sequence,
(6) a Twin-Prime sequence,
(7) a Barker sequence,
(8) a quadriphase Legendre sequence,
(9) a quadriphase generalized Sidelnikov sequence,
(10) a quadriphase complement-based Sequenz,
(11) a quadriphase Lee sequence,
(12) a sequence, which results from the sequences (1) to (11) by means of an invariance operation.

According to one embodiment, the randomization matrix is described by means of the sequence of its main diagonal elements, which indicates a randomization sequence.

According to one embodiment, the randomization sequence comprises a one-sequence or a sequence with perfect or good periodic autocorrelation, wherein the sequence can be one of the following sequences:
(1) a one-sequence (without randomization),
(2) a Frank sequence,
(3) a Frank-Zadoff-Chu sequence,
(4) a binary m-sequence,
(5) a binary Legendre sequence,
(6) a binary generalized Sidelnikov sequence,
(7) a Twin-Prime sequence,
(8) a Barker sequence,
(9) a quadriphase Legendre sequence,
(10) a quadriphase generalized Sidelnikov sequence,
(11) a quadriphase complement-based Sequenz,
(12) a quadriphase Lee sequence,
(13) a sequence, which results from the sequences (1) to (12) by means of an invariance operation,
(14) a linking of the sequences mentioned under (1) to (13) via the Kronecker product.

According to one embodiment, the method also comprises, based on the spread data vector, creating a transformed output vector for further processing by means of the transmission system.

According to one embodiment, the carrier signal comprises an OFDM signal with N subcarriers, with M coded data symbols being spread onto the N subcarriers, and with the transformed output vector being created by means of an inverse discrete Fourier transform.

According to one embodiment, the spreading matrix (D) is based on one of the following combinations of matrices:
Base spreading matrix (C) and randomization matrix (V), with the randomization matrix (V) not being defined by a one-sequence;
modified block spreading allocation matrix (T) and base spreading matrix (C);
spreading allocation matrix (T), base spreading matrix (C), and randomization matrix (V), with the spreading allocation matrix (T) being a modified block spreading allocation matrix (T) and/or with the randomization matrix (V) not being defined by a one-sequence;
circulant base spreading matrix (C);
circulant base spreading matrix (C) and randomization matrix (V);
spreading allocation matrix (T), circulant base spreading matrix (C), and randomization matrix (V), with the spreading allocation matrix (T) being a non-modified block spreading allocation matrix (T).

According to one embodiment, the spreading matrix comprises a circulant base spreading matrix and a non-modified block spreading allocation matrix, or a randomization matrix and a non-modified block spreading allocation matrix, where—for the non-modified block spreading allocation matrix—:

$\Sigma_{n=1}^{N}[T]_{nm}=1\forall m=1\ldots M$ with the non-modified block spreading allocation matrix (T) being composed of a unit matrix and a zero matrix, as follows:

$$T_{block}=\begin{pmatrix}I_M\\0_{(N-M),M}\end{pmatrix}.$$

According to the first aspect, the present invention further provides a method for de-spreading of a signal being transmitted in a transmission system, which comprises a plurality of data symbols, which were spread onto subcarriers of a carrier signal according to the first aspect of the method according to the invention, with the following steps:
providing a receive vector of the length N, which comprises the data symbols; and
de-spreading the provided receive vector by means of reverting of randomization, despreading of the receive vector and selecting a symbol vector of the length M.

According to one embodiment, reverting of randomization comprises the application of an inverse randomization matrix, de-spreading, application of an inverse base spreading matrix, and—by selecting a symbol vector of the length M—the application of an inverse block spreading allocation matrix.

Thus, the first aspect relates to an approach for spreading a plurality of data symbols onto subcarriers of a carrier signal for a transmission in a transmission system, wherein the spreading matrix used comprises a circulant base spreading matrix or a randomization matrix or an unmodified block spreading allocation matrix, with the randomization and the use of circulant base spreading matrices not being described in conventional technology. Conventional technology does not describe combining a known spreading matrix with a spreading allocation matrix, which is the non-modified block spreading allocation matrix, either.

(Second Aspect)

According to a second aspect, the present invention provides a method for spreading a plurality of data symbols onto subcarriers of a carrier signal for a transmission in a transmission system, with the following steps:
providing a data vector, which comprises the plurality of data symbols;
transforming the provided data vector; and
creating a spread data vector based on the transformed data vector and a spreading matrix subsequent to the transform, with the spread data vector having a length which corresponds to the number of subcarriers.

According to one embodiment, the spreading matrix comprises a diagonal matrix.

According to one embodiment, the spreading matrix comprises a diagonal matrix, which is defined by means of a spreading sequence.

According to one embodiment, the spreading sequence comprises a sequence with perfect periodic auto correlation function, wherein the sequence can be one of the followings sequences:
(1) a Frank sequence,
(2) a Frank-Zadoff-Chu sequence,
(3) a sequence, which results from the sequences mentioned under (1) and (2) by means of invariance operations,
(4) a sequence, which results from the sequences mentioned under (1)-(3) by means of DFT or IDFT,
(5) a sequence, which results from the sequences mentioned under (4) by means of invariance operations.

According to one embodiment, the spreading sequence comprises a sequence with good periodic autocorrelation function, wherein the sequence can be one of the following sequences:
(1) a binary m-sequence,
(2) a binary Legendre sequence,
(3) a binary generalized Sidelnikov sequence,
(4) a Twin-Prime sequence,
(5) a Barker sequence,
(6) a quadriphase Legendre sequence,
(7) a quadriphase generalized Sidelnikov sequence,
(8) a quadriphase complement-based Sequence,
(9) a quadriphase Lee sequence,
(10) a sequence, which results from the sequences mentioned under (1)-(9) by means of invariance operations.

According to one embodiment, the data symbols in the provided data vector are provided based on a block spreading allocation matrix to the inputs of the transformer, with the block spreading allocation matrix being a block spreading allocation matrix according to embodiments of the first aspect.

According to one embodiment, the spread data vector is further processed by means of the transmission system.

According to one embodiment, the carrier signal comprises an OFDM signal with N subcarriers, with M coded data symbols being spread onto the N subcarriers and with the provided data vector being transformed by means of inverse discrete Fourier transform.

According to a second aspect, the present invention further provides a method for de-spreading of a signal transmitted in a transmission system, which comprises a plurality of data symbols, which were spread onto subcarriers of a carrier signal according to the second aspect of the method according to the invention, with the following steps:
providing a receive vector of the length N, which comprises data symbols; and
de-spreading of the provided receive vector by means of de-spreading of the receive vector and selecting a symbol vector of the length M.

According to one embodiment, the de-spreading comprises multiplication with the inverse of the base spreading matrix, which is equivalent to the spreading sequence, and—by selecting a symbol vector of the length M—the application of an inverse block spreading allocation matrix.

According to one embodiment, the base spreading matrix, which is equivalent to the spreading sequence, results as follows:

$C_{eq} = \text{circ}(c_{eq})$, with $$c_{eq} = \frac{1}{\sqrt{N}} Fu = \frac{1}{\sqrt{N}} DFT(u),$$

with F being the DFT matrix, and $$\frac{1}{\sqrt{N}}$$

being a scaling factor.

According to embodiments of the first and second aspect, the number M of data symbols, which are spread, is less than the number N of subcarriers (M<N—"partially loaded system").

According to the first and second aspect, the present invention further provides a computer program with a program code for implementing the method according to the invention, if the program code runs on a computer or processor.

According to the first and second aspect, the present invention further provides an apparatus for spreading a plurality of data symbols onto subcarriers of a carrier signal for a transmission in a transmission system, with a processor, which is designed to implement the method according to the invention for spreading.

According to the first and second aspect, the present invention further provides an apparatus for de-spreading of a signal being transmitted in a transmission system, which comprises a plurality of data symbols, which were spread onto subcarriers or a carrier signal by means of the apparatus according to the invention, with a processor, which is designed to implement the method according to the invention for de-spreading.

According to the first and second aspect, the present invention further provides a transmission system with a transmitter, which comprises the apparatuses according to the invention for spreading, and with a receiver, which comprises the apparatus according to the invention for de-spreading, with the transmission system being a radio-tied and/or a line-tied system.

New matrix-based spreading methods and sequence-based matrix spreading methods (collectively referred to as "novel matrix spreading methods") are provided according to the first aspect, and the so-called low-complexity spreading (LC spreading) is provided according to the second aspect.

Embodiments of the first aspect of the invention provide novel spreading methods, which are defined by the combination of spreading allocation, base spreading, and randomization, respectively. A plurality of new spreading methods results from different combinations, which methods can be used to compensate for the influence of weak subcarriers in OFDM systems for frequency-selective channels, as can the methods described in conventional technology. The following advantages result according to the invention:

A1: The influence of weak subcarriers on the transmission quality is drastically reduced by the utilization of frequency diversity, thus reducing the error rate (compare the later discussed simulation results).

A2: Compared to OFDM systems with forward error correction (FEC), no redundancy has to be added to utilize the frequency diversity, which decreases the net data rate. In addition to spreading, FEC can be used in the system, to further reduce the error rate. In doing so, the channel coding used, however, does not have to compensate for the influence of weak subcarriers, any longer. Thus, the code rate can turn out larger for classic coding methods in connection with the spreading, than without spreading. The data rate is increased with constant transmission quality (constant error rate).

A3: By means of the partial load of the system, the robustness of the radio communication can be further increased for bad channel conditions by decreasing the net data rate. The same frequency diversity is utilized as is the case for full load. In addition, more power per usable data bit is available for decreasing load (decreasing M) with constant transmission performance. The adaption of the load (column amount M of the block spreading allocation matrix in the range of M=1 . . . N) can be realized very easily without the necessity of modifying base spreading and randomization. On such basis, different robust transmission modes can be implemented very easily. If fundamental page information is available at the transmitter (e.g. SNR at receiver or bit error rate in receive data stream), an adaptive transmission with fine tuned graduation of the net data rate can be realized with low complexity. The page information can be explicitly communicated to transmitter by receiver via the feedback channel, transmitter, however, can utilize intrinsic information, such as the amount of retransmissions that may be used, for adaption of the transmission. For the adaption of the data rate, the adaption of the load can be combined with other methods such as the modification of the modulation stage, the channel code (code with different rate, different pointing). Attention is to be paid to the fact that deterioration of signal statistics (ratio between instant performance and mean signal performance) can result for partial load, which deterioration will—in turn—reduce the gains achieved by means of partial load, if any.

Known spreading methods operate without the spreading allocation according to the invention (additional degree of freedom) and without the randomization according to the invention. The utilization of circulant spreading matrices, in particular circulant spreading matrices based on the sequences used according to the invention, are not known to conventional technology. For partial load, signal statistics deteriorate for the known approaches (the ratio between instant performance and mean signal performance increases), or the achievable frequency diversity is decreased. The spreading methods according to the invention based on cyclic spreading matrices have better signal statistics for partial load, even without randomization, i.e. utilization of the one-sequence as randomization sequence (compare to the later discussed simulation results), without decreasing the achievable frequency diversity. Signal statistics can be optimized by means of suitable combinations of block spreading allocation matrix and base spreading matrix.

According to embodiments of the first aspect, randomization based on suitable sequences is another novelty, which can be mathematically described by means of the randomization matrix. Randomization results in novel spreading methods, both in combination with known and circulant base spreading matrices. With a suitable selection of block spreading allocation and randomization matrix, the methods have improved signal statistics. In particular in connection with known base spreading matrices, drastic improvements can be achieved, which increase with decreasing load. Transmitting signals based on spreading methods with circulant base spreading matrices have improved signal statistics, from the beginning. With the help of randomization, further improvements can be achieved.

The improvement of signal statistics (low PAPR) in respect of known spreading methods can be utilized in different ways:

B1: With constant transmission performance the requirements to linearity of the components used in the system decrease, in particular with regards to the power amplifier. Thus, less high-quality and therefore lower priced components can be used, without deteriorating the transmission quality.

B2: With constant transmission performance and transmission quality, the operating points of the active components used in the system, in particular the operating point of the power amplifier, can be selected more favorably, which results in higher performance efficiency of the transmitter and in a decrease of its performance consumption.

B3: Without changing the components and the operating point, the transmission performance can be increased with constant transmission quality, without significant increase of the performance consumption of the transmitter. The performance efficiency of the transmitter and the range of the system are increased.

According to further embodiments of the first aspect, all mentioned spreading methods can be utilized in connection with multiplex and multiple access techniques, even in case of multiple users (up and downlink).

According to further embodiments of the first aspect, spreading-allocation division multiplexing (SADM) is implemented, an approach, which is not described in conventional technology, and which has the advantage, compared to FDM (frequency-division multiple access) that the same diversity gain can be achieved in case of multiple users as is the case for a single user. Furthermore, only one common base spreading and one randomization may be used for all users. Only the base spreading is user-specific, which simply means that a corresponding allocation of the data symbols of the users to the inputs of the base spreading takes place for the implementation (correct addressing of the memory cells). In doing so, an adaptive transmission—that is an adaption of the data rate for any user according to the current transmission conditions and rate requirements—is possible in an easy way.

According to the second aspect, low-complexity spreading (LC spreading) is provided. By means of the changed structure of the overall transform, such spreading presents a completely novel form of spreading in OFDM systems. LC spreading facilitates send-site implementation with very low complexity and is related to the sequence-based spreading methods according to the first aspect of the invention. All sequence-based spreading methods according to the first aspect of the invention without randomization can be implemented as send-site LC spreading.

By means of low complexity, fewer system resources (memory cells, computation time) may be used send-site. This can be utilized as follows:

C1: The resources becoming available can be utilized for other operations in the system or for expansion of the system (e.g. increase of the carrier amount). In doing so, the transmission quality and/or data rate can be further increased.

C2: Without loss of data rate and transmission quality, less complex hardware can be utilized for signal processing, or its clock speed can be reduced. In doing so, the costs and/or performance consumption of the system can be reduced.

For LC spreading, all advantages with respect to the spreading methods known from conventional technology—as is the case for the first aspect, (see advantages A1-A3 above, also compare to simulation results, discussed later) and additionally all advantages, as is the case for the first aspect—result with respect to improved signal statistics (see advantages B1-B3 above, also compare to simulation results, discussed later). In doing so, such signal statistics can be obtained, which can be achieved with all described sequence-based spreading methods without randomization. As for the first aspect, spreading-allocation division multiplexing (SADM) facilitates the support of several users in downlink fall. In consideration of LC spreading in connection with SADM, it facilitates the same diversity gain for the case of multiple users as in the case of a single user. Only the spreading allocation is user-specific. Even in case of multiple users, only one LC base spreading is implemented. For an implementation, this means that only one corresponding allocation of the data symbols of the users to the inputs of IDFT takes place (correct addressing of memory cells). The additional complexity for the spreading operation is thus negligible, compared to the case of a single user.

The methods according to the invention pursuant to the above described aspects can be applied pursuant to embodiments in digital information and data transmission systems, which use several carriers/subcarriers for the transmission, and the multiple carrier signal generation of which can be achieved with the help of IDFT or IFFT. This is true for line-tied systems as well as wireless systems. Line-tied systems of such type are oftentimes referred to as DMT systems, whereas wireless systems are referred to as OFDM systems. According to exemplary embodiments the methods are particularly interesting for optimization of OFDM systems in the area of wireless local area networks (WLAN, WPAN) and mobile communications, which operate without channel knowledge or without complete channel knowledge.

BRIEF DESCRIPTION OF THE DRAWINGS

Embodiments of the present invention will be detailed subsequently referring to the appended drawings, in which.

DETAILED DESCRIPTION OF THE INVENTION

Embodiments of the invention relate to novel spreading methods (novel spreading matrices and non-matrix-based spreading methods), which are optimized with respect to performance ability, signal statistics, adaptivity and/or efficient implementation.

(First Aspect—Novel Matrix Spreading Methods)

Embodiments of the invention according to the first aspect relate to novel spreading methods, which have not been considered in conventional technology, yet. The spreading methods are described by means of a spreading matrix, respectively. For further description, the spreading matrix D is split into three matrices T, C and V. We have:

$$D=VCT.$$

T is a matrix of the dimension N×M. It determines "spreading allocation" and will be referred to as "block spreading allocation matrix", hereafter. C, the "base spreading matrix", has the dimension N×N (square matrix) and defines "basis spreading". N will also be referred to as "spreading length, hereafter. V is a diagonal matrix of the dimension N×N and will be referred to as "randomization matrix", hereafter. It determines "randomization". The overall spreading consists of spreading allocation, base spreading and randomization.

Figure 1:
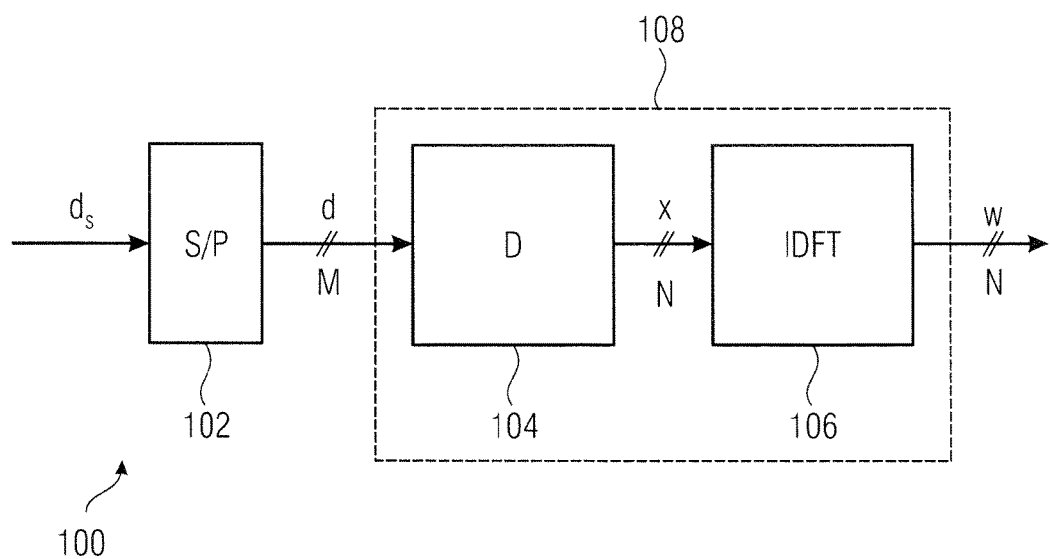
FIG. 1 shows a block diagram, by means of which signal processing is explained in a CS-OFDM transmitter.
Figure 2:
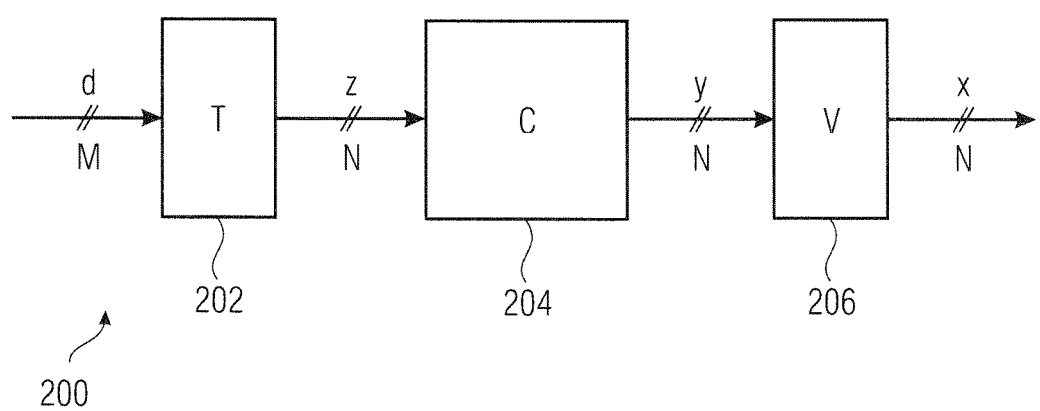
FIG. 2 shows a block diagram, by means of which the sequence of partial operations regarding matrix-based spreading is illustrated according to embodiments of the first aspect of the invention.

FIG. 2 shows a block diagram, by means of which the sequence 200 of the partial operations regarding matrix-based spreading is explained. Spreading allocation is implemented at block 202, block 204 conducts base spreading, and block 206 conducts randomization. Block 206 is also referred to as randomizer. It should be pointed out that the split shown in FIG. 2 facilitates clear mathematical description but can also be used for implementation. Construction rules for the matrices T, C and V are described, hereafter. The spreading matrix D (see FIG. 1) results from multiplication of the matrices, which defines the spreading method. If several matrices T, C and V are available, respectively, a plurality of spreading methods results by means of different combinations.

(Spreading Allocation)

Spreading allocation describes the allocation of M data symbols to the N inputs of base spreading (block 204 in FIG. 2). Spreading allocation is described by means of the block spreading allocation matrix T with the dimension N×N. We have:

$$z = Td.$$

The block spreading allocation matrix contains the elements 0 and 1 ($[T]_{nm} \in \{0, 1\}$) and fulfils the following conditions:

$$\sum_{m=1}^{M} [T]_{nm} \in \{0, 1\} \,\forall\, n = 1 \ldots N \quad \text{(condition 1)}$$

and $$\sum_{n=1}^{N} [T]_{nm} > 0 \,\forall\, m = 1 \ldots M \quad \text{(condition 2)}$$

Condition 1 makes sure that any of the N parallel inputs of base spreading can only be allocated one-fold. Condition 2 guarantees that all M data symbols are being taken into consideration for the subsequent base spreading. Because no further necessary conditions are connected to the block spreading allocation matrix, a plurality of matrices is possible depending on the selection of M and N. In particular, two types of block spreading allocation matrices are considered herein, which are described as non-modified block spreading allocation matrix $T_{block}$ and as modified block spreading allocation matrix $T_{rake}$. For these types, the second condition will be $\sum_{n=1}^{N}[T]_{nm}=1 \,\forall\, m=1 \ldots M$.

$T_{block}$ is composed of a unit matrix and a zero matrix, as follows:

$$T_{block} = \begin{pmatrix} I_M \\ 0_{(N-M),M} \end{pmatrix}.$$

$T_{rake}$ results via the auxiliary matrix $T_h$ by means of $$T_{rake} = \begin{pmatrix} T_h \\ 0_{(N - \lfloor \frac{N}{M} \rfloor M), M} \end{pmatrix}$$

where $$T_h = I_M \otimes \begin{pmatrix} 1 \\ 0_{(\lfloor \frac{N}{M} \rfloor - 1), 1} \end{pmatrix}$$

Further modified block spreading allocation matrices can be derived by means of cyclic shifting from $T_{block}$ or $T_{rake}$. If $T_{block/rake}$ is constituted by $$T_{block/rake} = \begin{pmatrix} t_{0,0} & t_{0,1} & \cdots & t_{0,M-1} \\ t_{1,0} & t_{1,1} & \cdots & t_{1,M-1} \\ \vdots & \vdots & \ddots & \vdots \\ t_{N-1,0} & t_{N-1,1} & \cdots & t_{N-1,M-1} \end{pmatrix}$$

the matrix cyclically shifted by k elements results by means of $$\tilde{T}_{block/rate,k} = \begin{pmatrix} t_{((0-k) \bmod N),0} & t_{((0-k) \bmod N),1} & \cdots & t_{((0-k) \bmod N),M-1} \\ t_{((1-k) \bmod N),0} & t_{((1-k) \bmod N),1} & \cdots & t_{((1-k) \bmod N),M-1} \\ \vdots & \vdots & \ddots & \vdots \\ t_{((N-1-k) \bmod N),0} & t_{((N-1-k) \bmod N),1} & \cdots & t_{((N-1-k) \bmod N),M-1} \end{pmatrix}$$

The inverse operation for spreading allocation is the extraction of M data elements from a vector of the length N. In connection with the conditions 1 and 2, we have:

$$d = LT^T z,$$

with L being a diagonal matrix of the dimension M×M, the main diagonal elements $[L]_{mm}$ of which are constituted by $$[L]_{mm} = \left( \sum_{n=1}^{N} [T]_{nm} \right)^{-1}$$

If we have $\sum_{n=1}^{N}[T]_{nm}=1 \,\forall\, m=1 \ldots M$, as this is the case for the defined types $T_{block}$ and $T_{rake}$ for example, the inverse operation is simplified to $$d = T^T z.$$

Spreading allocation is described herein mathematically as multiplication of the block spreading allocation matrix T with the input data vector d of the length M. The output vector z has the length N. By means of the operation, M data symbols are allocated to N inputs of base spreading. In a practical implementation, no vector matrix multiplication is required. The allocation can simply be realized by means of addressing of the respective memory cells, which contain the data symbols. The remaining input values will be set to zero.

For the inverse operation, the data symbols containing M are extracted from the vector of the length N. For the multiplication with the matrix $T^T$, no multiplication is required in a practical implementation. The extraction of the data symbols can be realized by means of addressing of the respective memory cells by means of additions. The multiplication with the matrix L (diagonal matrix) can be realized by means of element-by-element multiplication of the vector of the main diagonal elements with the vector $T^T z$ (Hadamard product).

If we have $\sum_{n=1}^{N}[T]_{nm}=1 \,\forall\, m=1 \ldots M$, as this is the case for the defined types $T_{block}$ and $T_{rake}$ for example, neither additions nor multiplications are required, and the extraction of the data symbols is implemented by means of correct addressing, as is the case for spreading allocation.

For known spreading methods, the spreading allocation is not considered explicitly. The introduction of spreading allocation results in a new degree of freedom for spreading, which had not been utilized up to now. In this form of the description, all known methods utilize only non-modified block spreading allocation matrices of the form $T=T_{block}$, by singling out the first M columns from the characterizing matrix to differentiate the spreading matrix.

Novel spreading methods thus result in any case of utilization of a modified block spreading allocation matrix (if $T \neq T_{block}$ is selected, for example for $T=T_{rake}$, $T=\tilde{T}_{rake,k}$ (k∈Z) oder $T=\tilde{T}_{block,k}$ (k∈Z^k mod N≠0) (oder=or). By means of a suitable selection of T, signal statistics can be optimized for a partial load. The above mentioned advantages B1-B3 result in consequence, as opposed to OFDM systems with spreading based on known spreading methods.
(Base Spreading)

Base spreading is illustrated by means of multiplication of the vector z with the base spreading matrix C:

$y=Cz$.

Only regular matrices are qualified as base spreading matrices (see section 2.6 of Appendix 2). Other matrices are not suitable for such purposes and will not be considered, further. In particular, spreading methods are suggested, which utilize the following base spreading matrix:
1. Hadamard matrices with elements from $\{1, -1\}$, Vandermonde matrices, and DFT matrices (see section 2.8 to 2.10 of Appendix 2)
2. circulant matrices based on sequences with special correlation properties For base spreading with the help of Hadamard matrices, Vandermonde matrices or DFT matrices, Hadamard matrices are utilized as base spreading matrices with elements from $\{1, -1\}$ (see section 2.8 of Appendix 2), Vandermonde matrices (see section 2.9 of Appendix 2), and DFT matrices (see section 2.10 of Appendix 2).

It should be pointed out that the DFT matrix is a special Vandermonde matrix (according to the definition of the DFT matrix in section 2.10 with a scaling factor $$\frac{1}{\sqrt{N}}\Big).$$

Due to its frequent utilization as spreading matrix and cost-convenient implementation by means of FFT, which is usable for DFT spreading, DFT spreading is discussed separately in this description.

For base spreading with the help of circulant matrices, circulant spreading matrices (see section 2.4 of Appendix 2) are used as base spreading matrix according to embodiments of the invention. One circulant base spreading matrix C of the dimension N×N has the following form:

$$C = \begin{pmatrix} c_1 & c_N & c_{N-1} & \cdots & c_2 \\ c_2 & c_1 & c_N & \cdots & c_3 \\ c_3 & c_2 & c_1 & \cdots & c_4 \\ \vdots & \vdots & \vdots & \ddots & \vdots \\ c_N & c_{N-1} & c_{N-2} & \cdots & c_1 \end{pmatrix}$$

and is completely described by means of the vector in the first column. In consequence, the statement of the elements $c_1, c_2 \ldots c_N$ is sufficient for the definition of suitable base spreading matrices. The sequence $c=(c_1, c_2 \ldots c_N)$ is referred to as "spreading sequence". The base spreading matrix results from the operation $C=\text{circ}(c)$.

Spreading methods, which are based on circulant spreading matrices, will be referred to as "sequence based matrix spreading methods", hereafter.

With respect to the requirements to the circulant base spreading matrix/the spreading sequence, the following three conditions are considered:
Condition 1: C is a regular matrix.
Condition 2: All elements of C have the same (a constant) amount. This is equivalent with the fact that all elements of the sequence c have the same amount: $|c_n|=C$ ∀ n=1 . . . N, C∈R$_+$*,
Condition 3: $CC^H=C^H C=A\cdot I$, A∈R$_+$*:

Conditions 2 and 3 can be considered as generalized Hadamard conditions (see section 2.8 of Appendix 2). Condition 3 can only be fulfilled if condition 1 is fulfilled. A spreading matrix, which fulfills condition 3, will thereby fulfill condition 1, in any case.

Condition 1 is considered as a useful condition. Non-regular matrices are not suitable as spreading matrices. Fulfillment of conditions 2 and 3 is not necessary. An optimal performance ability, however, (optimal utilization of frequency diversity, lowest possible BER for given SNR) is achievable for spreading methods, the spreading matrices of which fulfill both condition 2 and condition 3. Further advantages result from the fulfillment of condition 3 for the implementation of the de-spreading at receiver, because the inverse of the base spreading matrix corresponds to its adjoint. Furthermore, it is advantageous in view of a simple implementation, if the phase amount of the base spreading sequence is as low as possible.

According to embodiments of the invention, the spreading is being implemented on the basis of sequences with perfect periodic autocorrelation (PACF) as spreading sequence c, in particular based on the following sequences:
1. Frank sequences,
2. Frank-Zadoff-Chu sequences,
3. Sequences, which result from the sequences mentioned under 1. and 2., by means of invariance operations.

The listed sequences fulfill conditions 1 and 3, and—in addition—the mentioned sequences 3. on the basis of 1. and 2. (sequences, which result from Frank sequences or Frank-Zadoff-Chu sequences via DFT or IDFT), fulfill condition 2. The listed sequences according to 1. and 2. are specified in more detail in section 3.4 of Appendix 2. The invariance operations are defined in section 3.7 of Appendix 2.

According to further embodiments of the invention, the spreading is implemented based on Fourier transformed sequences, thus on the basis of sequences as spreading sequence, which were derived from other sequences with the help of DFT or IDFT. The respectively underlying sequence is referred to as "base sequence". Spreading sequence c results from the base sequence $s=(s_1, s_2, \ldots, s_N)^T$, either by means of DFT (see section 3.6 of Appendix 2):

$c_{DFT}=\text{DFT}(s)=Fs$ or by means of IDFT (see section 3.6 of Appendix 2):

$c_{IDFT}=\text{IDFT}(s)=F^{-1}s$.

F denotes the DFT and $F^{-1}$ denotes the IDFT matrix (see section 2.10 of Appendix 2). As base sequences, sequences with perfect periodic autocorrelation function or sequences with good periodic autocorrelation function are suggested, in particular the following sequences:
1. Frank sequences,
2. Frank-Zadoff-Chu sequences,
3. binary m-sequences,
4. binary Legendre sequences,
5. binary generalized Sidelnikov sequences,
6. Twin-Prime sequences,
7. Barker sequences,
8. quadriphase Legendre sequences,
9. quadriphase generalized Sidelnikov sequences,
10. quadriphase complement-based sequences,
11. quadriphase Lee sequences,
12. Sequences, which result from the sequences mentioned under 1.-11. by means of invariance operations.

The listed sequences fulfill conditions 1 and 3, and the sequences 12 on the basis of 1.-11. (sequences, which result from the sequences via DFT or IDFT) fulfill condition 2, additionally. The listed sequences are specified in more detail in sections 3.4 and 3.5 of Appendix 2. The invariance operations are defined in section 3.7 of Appendix 2.

The inverse operation of base spreading, base de-spreading, is generally constituted by $$z = C^{-1} y$$

If C fulfills the Hadamard conditions (see section 2.8 of Appendix 2), we have $$z = \frac{1}{N} C^H y$$

If C is unitary (see section 2.7 of Appendix 2), the relationship is simplified to $$z = C^H y.$$

All base spreading matrices particularly suggested hereunder, either fulfill the Hadamard conditions or they are unitary.

Base spreading is mathematically illustrated as multiplication of the base spreading matrix C with the input vector z. Depending on the selected base spreading, this operation can be implemented with the help of efficient algorithms, which utilize the special structure of the matrices. The fast Walsh-Hadamard transform (FWHT) can be used for Hadamard spreading. The fast Fourier transform (FFT) is available for DFT spreading. Multiplication of a Vandermonde matrix with a vector can be realized with the complexity O (N $\log^2$ (N)) (multiplications and additions; see reference [17]). For utilization of circulant matrices, an efficient algorithm is available, as well, which is based on the discrete Fourier transform (DFT) and the inverse discrete Fourier transform (IDFT), which, in turn, can be realized by means of FFT and the inverse fast Fourier transform (IFFT) (see reference [18]).

For base de-spreading, the same observations apply as for base spreading, with the inverse operations being applied here, meaning the IFFT and the inverse fast Walsh-Hadamard transform (IFWHT). Similarly, the structure of $C^H$ can be utilized to reduce computation complexity.

Spreading with the help of Hadamard, DFT, and Vandermonde matrices is principally known in conventional technology (see, for example, references [1]-[4], [5] for Hadamard spreading, references [3], [5] for DFT spreading, and reference [4] for Vandermonde spreading). Novel spreading methods result from the combination of base spreading (with the help of a Hadamard, DFT, or Vandermonde matrix), spreading allocation, and randomization, as soon as at least one of the following two conditions are fulfilled: $T \neq T_{block}$ or $v \neq 1_{N1}$ (the randomizing sequence is not the one-sequence). By means of a suitable combination of block spreading allocation matrix and randomization matrix/randomization sequence in connection with a Hadamard, DFT, or Vandermonde matrix as base spreading matrix, spreading methods result, which—compared to known spreading methods, which are based on the respective matrix types—result in better signal statistics for partial load. In consequence, the above mentioned advantages B1-B3 result as opposed to OFDM systems with spreading on the basis of known spreading methods.

The application of circulant spreading matrices is not described in conventional technology. The sequence-based matrix spreading methods connected therewith are novel. For a suitable selection of the spreading sequence, the sequence-based matrix spreading methods result in better signal statistics—for partial load—than known methods based on Hadamard, DFT, or Vandermonde matrices, (which are described in conventional technology). By means of the suitable combination of base spreading with the help of a circulant matrix, spreading allocation, and randomization, signal statistics can be optimized. The above mentioned advantages B1-B3 result as an overall consequence, as opposed to OFDM systems with spreading based on known spreading methods.

(Randomization)

According to this aspect of the invention, an implementation of a randomization operation takes place in connection with the spreading. In doing so, randomization can be viewed as an independent operation subsequent to the base spreading according to FIG. 2, or as part of the overall spreading operation according to FIG. 1. Randomization is defined via the randomization matrix V, which is completely described via the sequence of its main diagonal elements $v=(v_1, v_2, \ldots, v_N)$ (randomization sequence):

$$V = \text{diag}(v).$$

We have $$x = Vy.$$

Aside from the one-sequence, sequences with perfect periodic autocorrelation or with good periodic autocorrelation are suggested as randomization sequence as well as sequences, which result from the linking of the mentioned sequences via the Kronecker product. In particular, these are the following uniform sequences:
1. One-sequence (without randomization),
2. Frank sequences,
3. Frank-Zadoff-Chu sequences,
4. binary m-sequences,
5. binary Legendre sequences,
6. binary generalized Sidelnikov sequences,
7. Twin-Prime sequences,
8. Barker sequences,
9. quadriphase Legendre sequences,
10. quadriphase generalized Sidelnikov sequences,
11. quadriphase complement-based sequences,
12. quadriphase Lee sequences,
13. Sequences which result from the sequences mentioned under 1.-12. by means of invariance operations,
14. Linking of the sequences stated under 1.-13. via the Kronecker product.

Utilization of the one-sequence as randomization sequence presents the case without randomization. The sequences following 2.-13., are specified in more detail in sections 3.4 and 3.5 of Appendix 2. The invariance operations are defined in section 3.7 of Appendix 2. For 1.-13., the randomization sequence v is identical with the sequence s: v=s. The reference to certain sequences is marked in the index, e.g. $v_{frank}=s_{frank}$, when using a Frank sequence as randomization sequence.

For 14., v results from the linking via the Kronecker product of two sequences from 1.-13., wherein the sequence can also be linked to itself. From the linking of a Frank sequence $S_{frank}$ with itself, for example, results the randomization sequence $$v_{frank,frank}=s_{frank} \otimes s_{frank}$$

If two different sequences are linked to another, two different randomization sequences can be derived by means of changing the order during linking. From the linking of the one-sequence $s_{ones}$ with a Frank sequence $s_{frank}$ for example, result the two randomization sequences $$v_{ones,frank}=s_{ones} \otimes s_{frank}$$

and $$v_{frank,ones}=s_{frank} \otimes s_{ones}.$$

The linking of a FZC sequence $s_{fzc1}$ with another FZC sequence $s_{fzc2}$ (different length and/or different parameter λ) yields the randomizing sequences $$v_{fzc1,fzc2}=s_{fzc1} \otimes s_{fzc2}$$

and $$v_{fzc2,fzc1}=s_{fzc2} \otimes s_{fzc1}.$$

The length N of a sequence derived via the linking of two sequences of the lengths $N_1$ and $N_2$ amounts to $$N=N_1 N_2$$

Linking a sequence of the length $N_1$ with itself, thus yields $$N=N_1^2.$$

In consequence, the spreading sequences deduced in such way (linking of sequences with themselves) can only be constructed for lengths, which represent a square number. In addition, the construction rules for the underlying sequences may be observed, which exist only for certain lengths.

A special case is the linking of one-sequences among each other. From the linking of two one-sequences of the lengths $N_1$ and $N_2$, in turn, results the one-sequence of the length $N=N_1 N_2$.

The inverse operation for randomization, the de-randomization, is generally constituted by $$y=V^{-1}x.$$

$V^{-1}$ is a diagonal matrix, the main diagonal elements of which are constituted by $$[V^{-1}]_{nn}=\frac{1}{v_n}$$

For uniform randomization sequences, we have $$y=V^H x=\text{diag}(v^*)\cdot x.$$

All randomization sequences suggested here in particular, are uniform.

Randomization is mathematically illustrated as multiplication of the randomization matrix V with the input vector y. Because V is a diagonal matrix, this corresponds to the element-by-element multiplication of the vectors v and y: x=v∘y (Hadamard product). If a binary randomization sequence is being used, only changes of signs for the input vector y may be used.

The matrix $V^{-1}$ or $V^H$ for de-randomization is also a diagonal matrix, and the operation can be realized by means of element-by-element multiplication with the vector $$\left(\frac{1}{v_1},\frac{1}{v_2},\ldots,\frac{1}{v_n}\right)$$

or v*. When using a binary randomization sequence, we have v*=v, and only changes of signs may be used.

Randomization based on suitable sequences presents an essential novelty according to embodiments of the invention and is no known to conventional technology. Randomization results in new spreading methods, both in combination with known base spreading matrices (Hadamard, DFT, and Vandermonde matrices) and with the novel circulant base spreading matrices. For a suitable combination of block spreading allocation matrix and randomization matrix, such methods have improved signal statistics. Big improvements can be achieved, in particular in connection with the known spreading matrices (Hadamard, DFT, and Vandermonde matrices), which increase with decreasing load. Transmitting signals based on spreading methods with circulant base spreading matrices have better signal statistics, from the beginning. However, further improvements can be achieved by means of randomization. Overall, the above mentioned advantages B1-B3 result in consequence, as opposed to OFDM systems with spreading based on known spreading methods.

Figure 3:
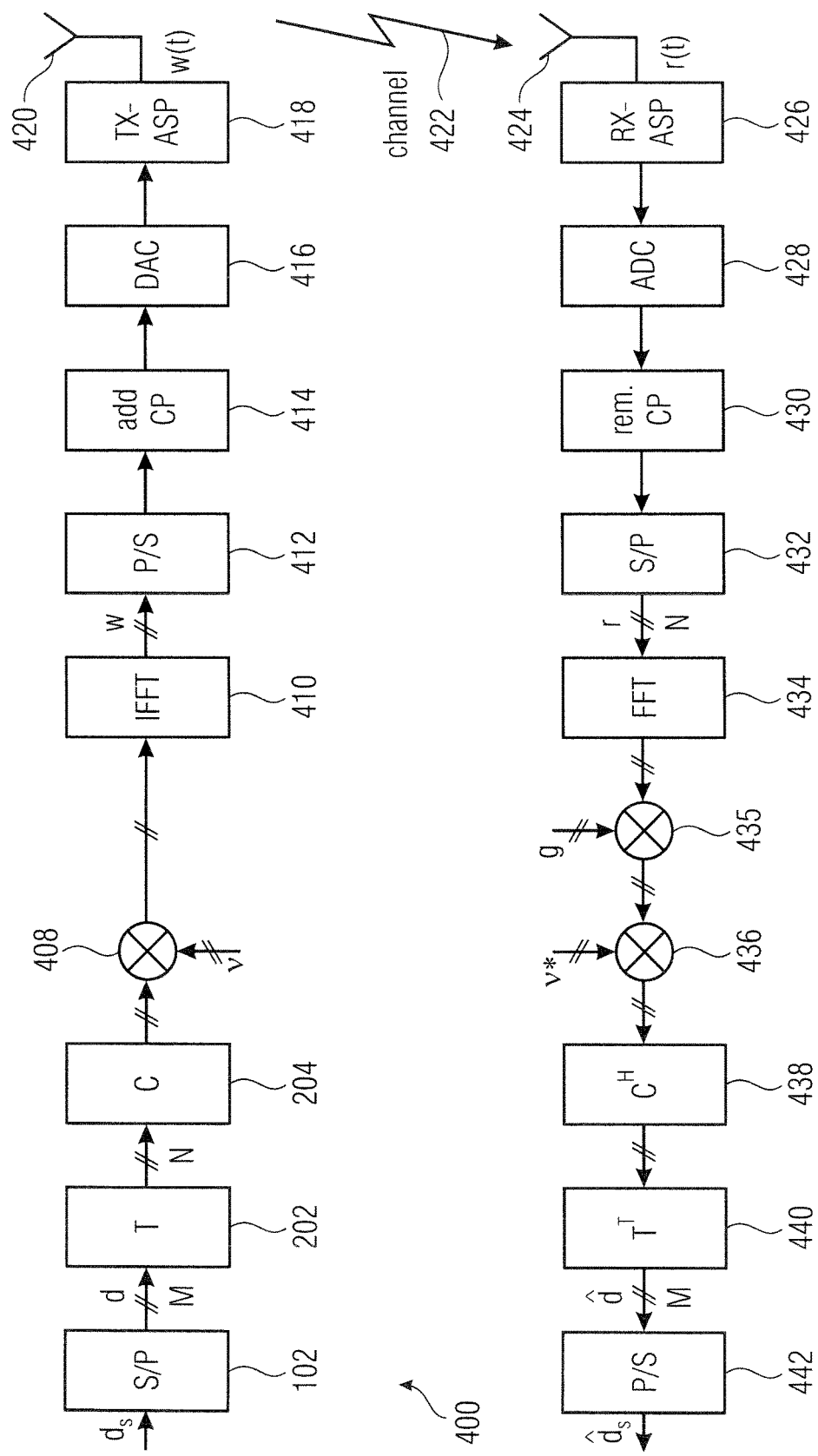
FIG. 3 shows an embodiment for a transmission system with a transmitter and a receiver, which operate according to embodiments of the first aspect of the invention.

By reference to FIG. 3, one embodiment for a transmitter and a receiver is described, hereafter. FIG. 3 shows a transmit/receive chain 400, which utilizes a linear receiver in the depicted example, which can be easily implemented and has a structure similar to the transmitter.

The (already coded, if any) transmit symbol stream $d_s$ is transformed in the transmitter with the serial/parallel converter 102 into transmit vectors of the length M. Block 202 implements the spreading allocation and yields vectors of the length N at the output. These are spread at block 204 with the base spreading matrix C and subsequently randomized at block 408 with the randomization sequence v. Subsequently, an IFFT is implemented at block 410 and a parallel/serial conversion at block 412. A cyclic prefix (CP) is added to the signal at block 414. Subsequently, the digital/analog conversion follows at bock 416, and the analog part of the transmitter 418. It comprises all components, which may be used to convert the signal into the radio frequency range (for example filter, amplifier, mixer). The output signal w(t) is emitted via the antenna 420.

After transmission via the radio channel, the signal r(t) is received by the receive antenna 424 and fed to the analog part of the receiver 426. It comprises all components that may be used to recover the base band signal from the radio frequency signal (for example filter, amplifier, mixer). The analog/digital converter 428 converts the analog signal into a digital signal. Subsequently, the digital prefix is removed (block 430), and a serial/parallel conversion of the signal to receive vectors r of the length N is implemented at bock 432. FFT at block 434 and channel equalization follow, which is illustrated as element-by-element multiplication with the vector g (equalization vector). By means of the multiplication unit 436, the randomization implemented in the transmitter is reverted with the help of element-by-element multiplication (in the example given, repeated randomization with the sequence v*). Subsequently, de-spreading at block 438, selection of the symbol vectors of the length M at bock 440, and the parallel/serial conversion at block 442 take place. Finally, the data stream of the estimated symbols d exists at the output of this block. If FEC is used in the system, these symbols are still symbols with channel coding, which are subsequently fed to the channel decoder (at symbol- or bit level).

Specifically, a partially loaded system (M=4) with 16 subcarriers (N=16) is considered. The block spreading allocation matrix is selected as follows:

$$T = T_{rake} = \begin{pmatrix} 1 & 0 & 0 & 0 \\ 0 & 0 & 0 & 0 \\ 0 & 0 & 0 & 0 \\ 0 & 0 & 0 & 0 \\ 0 & 1 & 0 & 0 \\ 0 & 0 & 0 & 0 \\ 0 & 0 & 0 & 0 \\ 0 & 0 & 0 & 0 \\ 0 & 0 & 1 & 0 \\ 0 & 0 & 0 & 0 \\ 0 & 0 & 0 & 0 \\ 0 & 0 & 0 & 0 \\ 0 & 0 & 0 & 1 \\ 0 & 0 & 0 & 0 \\ 0 & 0 & 0 & 0 \\ 0 & 0 & 0 & 0 \end{pmatrix}$$

A sequence based matrix spreading is being implemented. A Frank sequence of the length N=16 is being applied as spreading sequence c:

$$c = (+1,+j,-1,-j,+1,-1,+1,-1,+1,-j,-1,+j,+1,+1,+1,+1)^T$$

The base spreading matrix C=circ(c) will then be $$C = \begin{pmatrix} +1 & +1 & +1 & +1 & +1 & +j & -1 & -j & +1 & -1 & +1 & -1 & +1 & -j & -1 & +j \\ +j & +1 & +1 & +1 & +1 & +1 & +j & -1 & -j & +1 & -1 & +1 & -1 & +1 & -j & -1 \\ -1 & +j & +1 & +1 & +1 & +1 & +1 & +j & -1 & -j & +1 & -1 & +1 & -1 & +1 & -j \\ -j & -1 & +j & +1 & +1 & +1 & +1 & +1 & +j & -1 & -j & +1 & -1 & +1 & -1 & +1 \\ +1 & -j & -1 & +j & +1 & +1 & +1 & +1 & +1 & +j & -1 & -j & +1 & -1 & +1 & -1 \\ -1 & +1 & -j & -1 & +j & +1 & +1 & +1 & +1 & +1 & +j & -1 & -j & +1 & -1 & +1 \\ +1 & -1 & +1 & -j & -1 & +j & +1 & +1 & +1 & +1 & +1 & +j & -1 & -j & +1 & -1 \\ -1 & +1 & -1 & +1 & -j & -1 & +j & +1 & +1 & +1 & +1 & +1 & +j & -1 & -j & +1 \\ +1 & -1 & +1 & -1 & +1 & -j & -1 & +j & +1 & +1 & +1 & +1 & +1 & +j & -1 & -j \\ -j & +1 & -1 & +1 & -1 & +1 & -j & -1 & +j & +1 & +1 & +1 & +1 & +1 & +j & -1 \\ -1 & -j & +1 & -1 & +1 & -1 & +1 & -j & -1 & +j & +1 & +1 & +1 & +1 & +1 & +j \\ +j & -1 & -j & +1 & -1 & +1 & -1 & +1 & -j & -1 & +j & +1 & +1 & +1 & +1 & +1 \\ +1 & +j & -1 & -j & +1 & -1 & +1 & -1 & +1 & -j & -1 & +j & +1 & +1 & +1 & +1 \\ +1 & +1 & +j & -1 & -j & +1 & -1 & +1 & -1 & +1 & -j & -1 & +j & +1 & +1 & +1 \\ +1 & +1 & +1 & +j & -1 & -j & +1 & -1 & +1 & -1 & +1 & -j & -1 & +j & +1 & +1 \\ +1 & +1 & +1 & +1 & +j & -1 & -j & +1 & -1 & +1 & -1 & +1 & -j & -1 & +j & +1 \end{pmatrix}$$

To improve the signal statistics, a randomization sequence v is used, which results from the linking of two Frank sequences of the length L=4:

$$v = s_{frank,4} \otimes s_{frank,4}$$

with $$s_{frank,4} = (+1,-1,+1,+1)^T$$

the following is obtained $$v = (+1,-1,+1,+1,-1,+1,-1,-1,+1,-1,+1,+1,+1,-1,+1,+1)^T.$$

To calculate the equalization vector g—depending on the channel properties—known methods can be used. One possibility, for example, is calculation using the MMSE criterion (see Reference [1]).

The sequence to undo the randomization again is given by v*. In the present case the following applies $$v^* = v = (+1,-1,+1,+1,-1,+1,-1,-1,+1,-1,+1,+1,+1,-1,+1,+1)^T.$$

The despreading is carried out by multiplication with $C^H$ and the selection of the symbol vectors is finally carried out by multiplication with the matrix $T^T$.

Summarized, the signal vector w in the transmitter results from $$w = F \cdot \text{diag}(v) \cdot CTd$$

and the estimated symbol vector $\hat{d}$ in the receiver from $$\hat{d} = T^T C^H \text{diag}(v^*) \text{diag}(g) F^{-1} r.$$

Simulation results are explained in more detail below. The efficiency of the matrix spreading method according to the invention was investigated by simulation. Exemplary simulation results are shown below. They also take into consideration the above embodiments, wherein M and N were scaled with the factor 16 with regard to a practical system.

Figure 4:
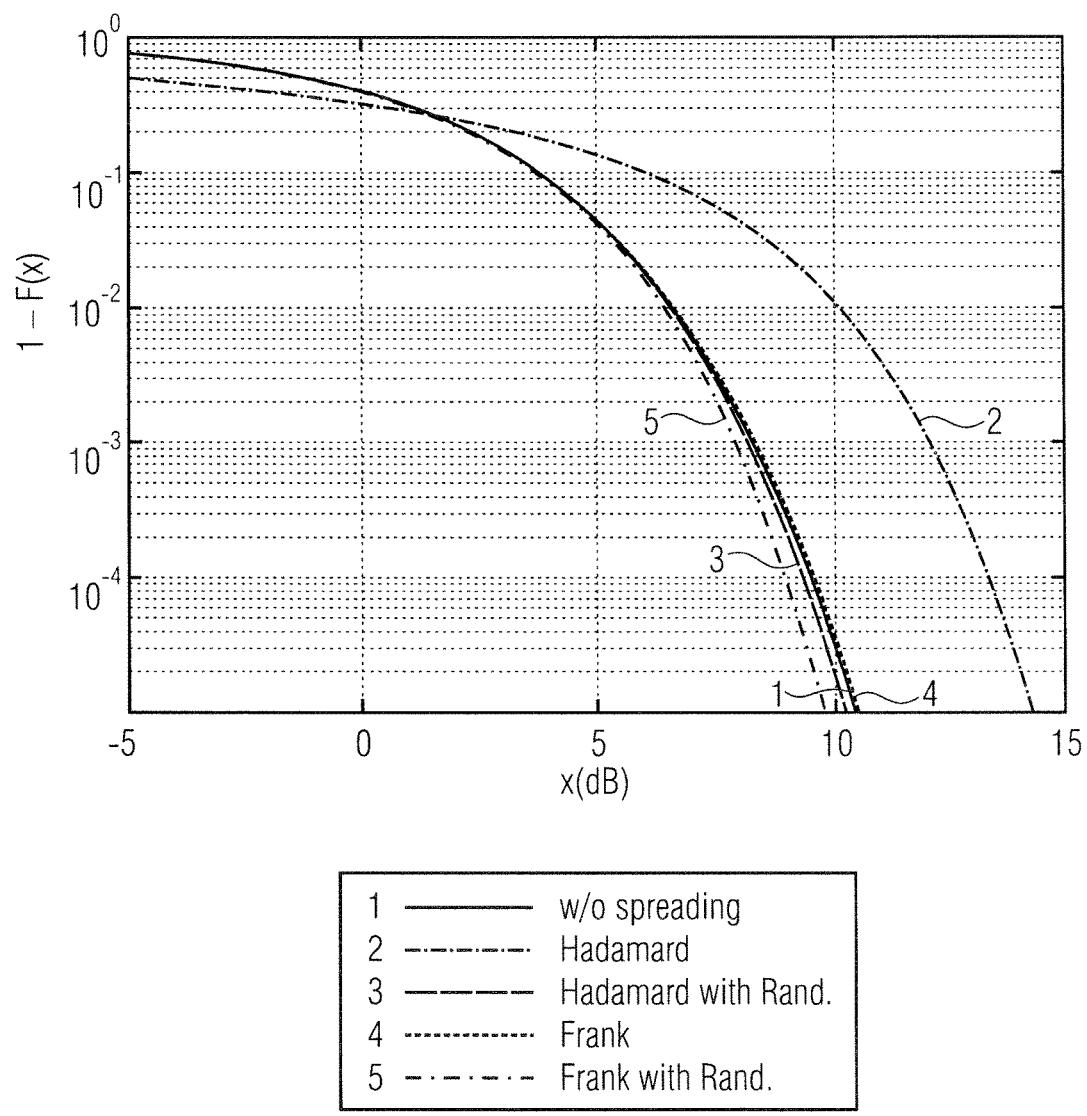
FIG. 4 shows a graph, which displays signal statistics in form of the complementary cumulative distribution function (CCDF) of the signal amplitude for various known spreading methods and spreading methods according to embodiments of the first aspect of the invention.

FIG. 4 shows a comparison of the signal statistics in the form of the complementary cumulative distribution function (CCDF) of the signal amplitude for different spreading methods. An OFDM system with N=256 subcarriers was assumed. The curve 1 ("w/o Spreading") results without spreading for M=64 QPSK data symbols. Of the 256 subcarriers in this case only the first 64 were allocated. In every other case M=64 QPSK data symbols were spread on N=256 OFDM subcarriers. This is therefore a partially loaded system. The conventional Hadamard spreading (curve 2 ("Hadamard"), corresponds to $T=T_{block}$, Hadamard matrix as base spreading matrix, a one sequence as randomization sequence) considerably impairs the signal statistics (by approx. 4 dB at $1-F(x)=10^{-4}$). The curve 3 ("Hadamard with Rand.") shows the signal statistics for the method according to the invention, in which a Hadamard matrix is likewise used as a base spreading matrix, but in addition a randomization is used ($T=T_{block}$, Hadamard matrix as base spreading matrix, randomization sequence $v=v_{frank,frank}$). The signal statistics of the new Hadamard spreading method is much better, even slightly better than without spreading. The curve 4 ("Frank") results with the sequence-based matrix-spreading according to embodiments for the example $T=T_{rake}$, Frank sequence as spreading sequence, a one sequence as randomization sequence. The signal statistics are significantly better than with the conventional Hadamard spreading, virtually identical to the statistics of the signal without spreading. It can be further improved, if in addition a randomization is used. This is shown by the curve 5 ("Frank with Rand," $T=T_{rake}$, Frank sequence as spreading sequence, randomization sequence $v=v_{frank,frank}$, corresponds to the above embodiment with M and N scaled by the factor 16). This spreading method according to the invention performs best with regard to the signal statistics in the present comparison.

Figure 5:
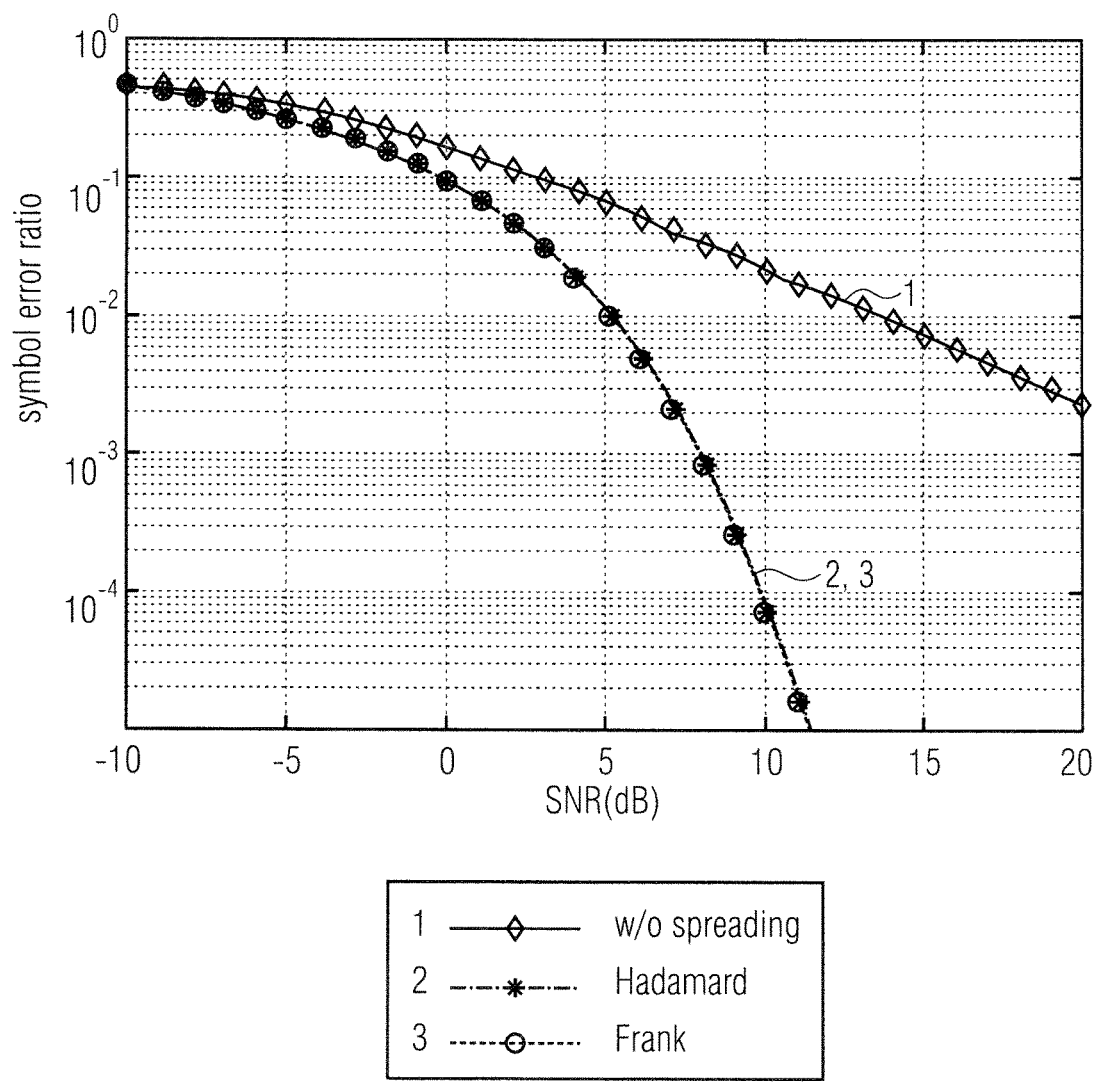
FIG. 5 shows a graph, which illustrates the symbol error rate (SER) for various known spreading methods and spreading methods according to embodiments of the first aspect of the invention in respect to the mean SNR per subcarrier.

The symbol error rate (SER) of the methods with respect to the average SNR per subcarrier is shown in FIG. 5. The curve 1 ("w/o spreading") results without spreading with allocation of the first 64 of 256 subcarriers with QPSK data symbols. In the two other cases, M=64 QPSK data symbols were spread on N=256 OFDM subcarriers. The transmit signals were transmitted via a frequency-selective channel (subcarrier with independent Rayleigh fading) with AWGN. An MMSE channel equalization with perfect channel knowledge was carried out at the receiver.

Without spreading, the curve dips only very weakly with increasing SNR. A symbol error rate of $10^{-3}$ is not achieved in the simulated SNR range up to 20 dB. Spreading (curve 2 ("Hadamard") and curve 3 ("Frank")) results in a diversity gain, which is expressed in a much steeper drop of the curves. Since the spreading allocation and the randomization do not have any influence on the course of the SER over the SNR, the curve 2 ("Hadamard") applies for the conventional Hadamard spreading as well as for all methods according to the invention which use a Hadamard matrix (of the dimension 256×256) as a base spreading matrix. The curve 3 ("Frank") applies equally for all variants (different spreading allocation and/or randomization) of the sequence-based matrix-spreading with a Frank sequence with the length 256 as spreading sequence.

For the given simulation parameters, the conventional Hadamard spreading and the spreading methods according to the invention have the same efficiency with respect to the SER over the SNR. Since the methods according to the invention perform much better with regard to the signal statistics, however, for example, with the same power consumption of the transmitter amplifier a higher SNR at the receiver can be achieved or for the same SNR the power consumption can be reduced.

(Partial Allocation, FDM, FDMA)

In the embodiments, a spreading of M data symbols over the N subcarriers of the OFDM system was considered. One possible variant with partial loading lies in spreading the data vectors not on vectors of the length N, but only on vectors of the length $N_S<N$ and thus in not allocating all the subcarriers of the system. The assignment of the $N_S$ elements of the spread vector to the N subcarriers (subcarrier allocation) can be carried out in different ways. For example, the first $N_S$ of N subcarriers are allocated. In this case, the bandwidth of the transmission signal is reduced. If subcarriers are skipped in the allocation, however, gaps are formed in the spectrum of the transmission signal. The free subcarriers can be used for data transmission to other stations/users (downlink case) or used by other stations/users (uplink case). This is an FDM method in the downlink (Frequency-Division Multiplexing) or an FDMA method in the uplink (Frequency-Division Multiple Access). To achieve the highest possible diversity gain, it is advantageous if the subcarriers allocated for a user or by a user are spaced as far apart from one another as possible.

With FDM as well as with FDMA a spreading (spreading allocation, base spreading, randomization) with the spreading length $N_S$ is to be carried out for each user or by each user. $N_S$ can thereby optionally have different values for different users. The complexity in the downlink is increased by the fact that for each user, if applicable, a specific spreading allocation, base spreading and randomization has to be carried out. If an adaptive transmission (adaptation of the data rate for each user according to the current transmission conditions and rate requirements) is realized by adaptation of the allocation (with regard to individual users), moreover, the spreading length may change in rapid chronological sequence.

Since only a part of the subcarriers are allocated for a user or by a user, the diversity gain theoretically to be achieved by the spreading is reduced. This is relevant in practice when small spreading lengths (for example $N_S<10$) result. For large spreading lengths and a suitable subcarrier allocation (subcarriers allocated for a user or by a user are in each case to be spaced as far apart from one another as possible), however, in practice no substantial losses in efficiency result.

The described partial allocation of subcarriers (with respect to individual users) for the purpose of FDM or FDMA in connection with OFDM systems is known. It is likewise mentioned with regard to CS-OFDM systems (for example, in reference [16] for the DFT spreading). It should be noted that all the spreading methods according to the invention can be used in connection with FDM or FDMA. (Spreading-Allocation-Division Multiplexing (SADM))

Another possibility for supporting several users in the downlink case lies in the use of user-specific block spreading allocation matrices, which is referred to as SADM. In contrast to FDM, all subcarriers are respectively allocated by each user. If K users are to be supported and if $T_k$ designates the block spreading allocation matrix assigned to the user k, the following applies in addition to the above condition 2:

$$\sum_{k=1}^{K}\sum_{m=1}^{M}[T_k]_{nm}\in\{0,1\}\;\forall\,n=1\ldots N$$

which can be regarded as an expanded condition 1. It ensures that each of the N parallel inputs of the base spreading can be allocated only singly even in the case of multiple users. The input vector for the base spreading results from superposition of the K output vectors (one output vector per user) from the spreading allocation. When the condition is satisfied and a spreading according to the invention is carried out, the K data streams can be received by the individual users without reciprocal interference (multi-user interference, MUI). No modification of the receiver is necessary for this, in contrast to the single user case.

The multiplexing method referred to as SADM for supporting several users in the downlink case is not described in conventional technology. It is thus a new type of multiplexing method for CS-OFDM systems.

Since all subcarriers are respectively allocated by each user, compared to FDM, the method provides the advantage that even in the case of multiple users, the same diversity gain can be achieved as in the case of a single user. Furthermore, only one common base spreading and one randomization are needed for all users. Only the spreading allocation is user-specific, which in the implementation means only that a corresponding assignment of the data symbols of the users has to be made to the inputs of the base spreading (correct addressing of the storage cells). An adaptive transmission, that is, an adaptation of the data rate for each user according to the current transmission conditions and rate requirements, is thus easily possible.

(Time-Division Multiplexing (TDM)/Time Division Multiple Access (TDMA))

To support several users, all of the spreading methods described can be combined with TDM (downlink) or TDMA (Uplink). As with SADM, the same diversity gains are achieved as in the case of a single user. The same spreading can be carried out for each user or by each user. Different rate requirements and an adaptive transmission can be covered via variation of the user-specific transmission length.

The TDM or TDMA method is known in conventional technology. It is used in single-carrier transmission systems as well as in OFDM systems. It should be noted that all of the spreading methods according to the invention can be used in connection with TDM or TDMA.

(Complexity Reduction by Reducing the Spreading Length, Block-OFDM (BOFDM))

The spreading length (dimension of the spreading matrix) can be reduced at the expense of the diversity gain by a modification of the processing chain described above. This can be useful with a high number of subcarriers in order to reduce the complexity of implementation. The modification lies in dividing the data input vector of the length M for example into input vectors of the length $$M_p = \frac{M}{K},$$

to carry out the spreading allocation and spreading of the K input vectors on output vectors of the length $$N_p = \frac{N}{K}(N \bmod K \equiv 0)$$

(K base spreadings) and assigning the elements of the output vectors (in total $K \cdot N_p = N$) to the N subcarriers. The assignment of the elements can be carried out in different ways. To maximize the frequency diversity, the elements of an output vector are advantageously assigned to subcarriers as far apart from one another as possible. The modification can be used with full loading (M=N) or partial loading (M<N) (see e.g., the BOFDM described in reference [21]).

In the above explanations a division of the data vector into K vectors of equal length was carried out. This does not necessarily have to be the case. Vectors of different length can also be processed, wherein then spreading allocation matrices and base spreading matrices of different dimension may be used.

For the DFT spreading, the Fast Fourier-Transform (FFT) can be used, that is, an efficient algorithm for calculating the Discrete Fourier-Transformation (DFT). The effort is O (N log (N)), wherein multiplications with the root of unity and additions may be used. The Vandermonde spreading (multiplication of a Vandermonde matrix of the dimension N×N with a symbol vector of the length N) can be realized with the effort O (N $\log^2$ (N)) (multiplications and additions; see Reference [17]). The Hadamard spreading can be carried out with the aid of the fast Walsh-Hadamard transform (FWHT). It involves additions or subtractions and thus has the lowest computing power among the methods with full flexibility (finely graduated partial loading, selection of the carriers).

The complexity reduction for a fixed N results in that the number of operations that may be used for the spreading is reduced. If, for example, N log (N) operations may be used beforehand, the number afterwards is only $$N_p \log(N_p) = \frac{N}{K} \log\left(\frac{N}{K}\right).$$

A complexity reduction within the meaning of asymptotic behavior (N→∞) results when K is not selected in a fixed manner, but likewise increases with rising N. For example, if $$k = K(N) = \frac{N}{N_{fixed}}$$

is selected, a system results with the constant spreading length $N_{fixed}$.

Since in each case only a spreading over $N_p$ instead of over N subcarriers takes place, the diversity gain that can be theoretically achieved by the spreading is reduced. This is relevant in practice when low spreading lengths (for example $N_p$<10) result. For long spreading lengths and a suitable subcarrier allocation (the outputs from a spreading are assigned to subcarriers, which in each case are spaced as far as possible from one another), however, in practice decisive losses in efficiency do not result.

The division and the combination can be realized solely by correct addressing of storage cells, whereby the additional effort for the operations can be neglected.

A complexity reduction for a system where N=256 and M=64 is explained by way of example. K=4 is chosen so that the original spreading operation is divided into 4 spreading operations, which can be carried out simultaneously or consecutively.

The original symbol input vector $d=(d_1, d_2, \ldots d_{64})^T$ of the length M=64 is divided into 4 input vectors $\tilde{d}_1 \ldots \tilde{d}_4$ of the length $M_p$=16, which are respectively fed to spreading allocation. The division can be carried out as follows, for example:

$$\tilde{d}_1=(d_1,\ldots,d_{16})^T, \tilde{d}_2=(d_{17},\ldots,d_{32})^T, \tilde{d}_3=(d_{33},\ldots,d_{48})^T, \tilde{d}_4=(d_{49},\ldots,d_{64})^T$$

This has the dimension $N_p \times M_p$=64×16. After the spreading allocation, four vectors $\tilde{z}_1 \ldots \tilde{z}_4$ of the length $N_p$=64 are available, on which in each case the base spreading is carried out. The output vectors $\hat{y}_1 \ldots \hat{y}_4$ of the length $N_p=64$ are respectively subjected to randomization. At the end of the spreading, the four vectors $\tilde{x}_1 \ldots \tilde{x}_4$ are available. These are finally combined to form a vector x, which subsequently runs through all operations of the original system with N=256 and M=64. The combination can be carried out as follows, for example:

$$x = \begin{pmatrix} \tilde{x}_1 \\ \tilde{x}_2 \\ \tilde{x}_3 \\ \tilde{x}_4 \end{pmatrix}.$$

For despreading in the receiver, in each case the inverse operation to combination and division in the transmitter may be taken into consideration. The DFT (FFT) is followed by the division of the vector into 4 vectors (inverse operation to the combination in the receiver). Subsequently, the channel equalization and the despreading—composed of derandomization, base spreading and selection of the symbol vectors—are carried out. Finally, the combination of the four output vectors from the despreading takes place (inverse operation to division in the transmitter).

The complexity reduction leads for example to the Block-OFDM method with spreading described in der Reference [21]. It is known in principle. However, it is expressly noted that all of the spreading methods according to the invention are reduced in their complexity by the reduction of the spreading length or can be used in block OFDM systems.
(Second Aspect—Low-Complexity Spreading (LC Spreading))

Embodiments of the invention according to the second aspect relate to a new form of spreading, which renders possible implementations with minimal effort with respect to computing efficiency and memory consumption. It is therefore referred to below as "Low-Complexity spreading" (LC spreading). LC spreading, like the matrix spreading described above, is based on suitable spreading sequences and there is a direct connection between the two methods or aspects. The term "sequence-based spreading method" or "sequence-based spreading" below relates to sequence-based matrix spreading (first aspect) as well as to LC spreading (second aspect).

Figure 6:
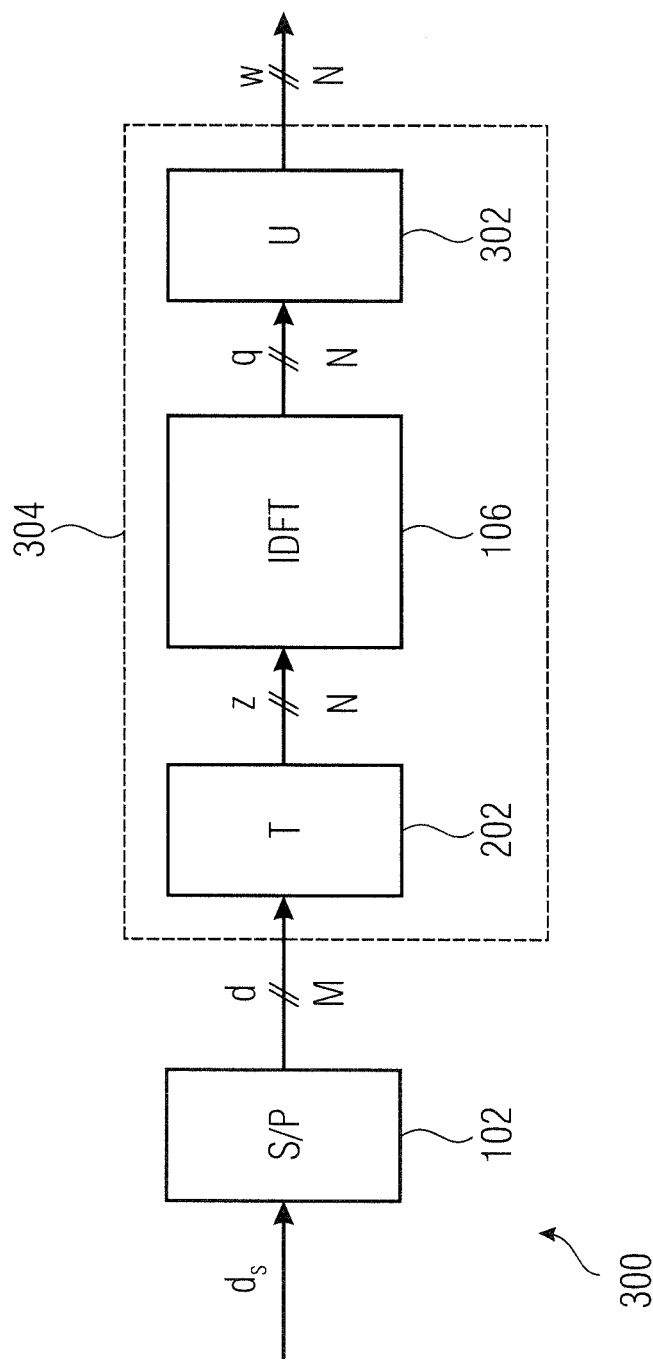
FIG. 6 shows a block diagram, by means of which signal processing in a transmitter for LC spreading is described according to embodiments of the second aspect of the invention.

FIG. 6 shows a block diagram, based on which the signal processing in a transmitter with an LC spreading is described according to embodiments of the invention. FIG. 6 shows a processing chain 300 for generating the spread OFDM signal with LC spreading. The stream of data symbols $d_s$ is converted with the aid of the serial/parallel converter 102 into data vectors d of the length M. The spreading allocation is carried out in the block 202. The block 106 subsequently carries out the IDFT. Finally, the LC base spreading is carried out in block 302. The blocks 106, 202 and 302 can be combined to form an "LC overall transformer" 304 analogously to FIG. 1, which carries out the "LC overall transform." The transformed output vectors w can be subjected to further operations in the digital baseband (e.g. insertion of a Guard Interval, windowing). They are converted into analog signals by a digital-to-analog converter and until emission via the antenna(s) run through the typical processing chain of a radio transmitter for digital data transmission.

The signal processing operations are shown mathematically with the aid of matrices and vectors. Column vectors are used thereby, unless stated otherwise.

The transformed output vector w results from the input vector d by $$w=UF^{-1}Td.$$

T is thereby the spreading allocation matrix, $F^{-1}$ is the inverse Fourier matrix (see Section 2.10 of Annex 2). U is a diagonal matrix of the dimension N×N and is referred to below as "LC base spreading matrix."

The above statements according to the first aspect regarding the spreading allocation in connection with the matrix spreading method according to the invention apply equivalently to LC spreading, wherein the spreading allocation with LC spreading does not describe the assignment of the data symbols to the inputs of the base spreading, but to the inputs of the IDFT. The inverse operation to the spreading allocation is the extraction of the M data symbols from the vector of the length N. The statements in this respect according to the first aspect (matrix spreading method) apply equivalently to LC-spreading. The selection of the data symbols is carried out following the DFT. With respect to implementation, the above statements according to the first aspect (matrix spreading method) apply equivalently to LC spreading. It should be noted that the spreading allocation with LC spreading does not describe the assignment of the data symbols to the inputs of the base spreading, but to the inputs of the (IDFT). Furthermore, the selection of the data symbols (inverse operation) in the case of LC spreading takes place following the DFT. The spreading allocation leads to an additional degree of freedom in the LC spreading. By a suitable selection of the spreading allocation matrix T, the signal statistics can be optimized with a partial loading. This results in the advantages B1-B3 described above compared to OFDM systems with spreading on the basis of known spreading methods. The described form of LC spreading is not described in conventional technology and the spreading allocation is not explicitly considered either in known spreading methods.

The LC base spreading is shown with the aid of the LC base spreading matrix U. This is a diagonal matrix of the dimension N×N. It is defined fully by the main diagonal entries $u_1, u_2, \ldots u_N$ and results from the vector or the sequence s $u=(u_1, u_2, \ldots u_N)^T$ by $$U=\text{diag}(u).$$

The sequence u is referred to as the "LC spreading sequence," and the demands made on the LC spreading sequence are formulated via the matrix $$C_{eq} = circ(c_{eq}) = circ\left(\frac{1}{\sqrt{N}}Fu\right)$$

where F is the DFT matrix (see Section 2.10 in Annex 2). $C_{eq}$ is referred to as the base spreading matrix equivalent to the LC spreading sequence u, the sequence $$c_{eq} = \frac{1}{\sqrt{N}}Fu$$

as equivalent base spreading sequence. Analogously to the sequence-based matrix spreading described above with the aid of circulant matrices (first aspect) the following conditions are considered:

Condition 1: $C_{eq}$ is a regular matrix.

Condition 2: All of the elements of $C_{eq}$ have the same (a constant) amount. This means the same as that all elements of the sequence $C_{eq}=(C_{eq,1}, C_{eq,2}, \ldots, C_{eq,N})$ have the same amount:

$|c_{eq,n}|=C$ $\forall n=1 \ldots N$, $C \in R_+^*$.

Condition 3: $C_{eq} \cdot C_{eq}^H = C_{eq}^H \cdot C_{eq} = A \cdot I$, $A \in R_+^*$.

Conditions 2 and 3 can be regarded as generalized Hadamard conditions (see Section 2.8 of Annex 2). Condition 3 can be satisfied only when condition 1 is satisfied. Thus an equivalent spreading matrix that satisfies condition 3, in any case satisfies condition 1.

Condition 1 is regarded as a useful condition. A sequence, the equivalent spreading matrix of which does not satisfy condition 1, is not suitable as an LC spreading sequence. The satisfaction of conditions 2 and 3 is not necessary. However, an optimal efficiency (optimal utilization of frequency diversity, lowest possible BER for given SNR) can be theoretically achieved only by LC spreading methods, the spreading matrices of which equivalent to the LC spreading sequence satisfy condition 2 as well as condition 3.

With respect to easy implementation, it is advantageous if the phase number of the LC spreading sequence is as low as possible.

Sequences for LC spreading are suggested below on the basis of sequences with perfect periodic autocorrelation according to an embodiment. These sequences satisfy the conditions 1-3. According to this embodiment, sequences with perfect periodic autocorrelation function (PACF) are used as LC spreading sequence u, e.g. the following sequences:
1. Frank sequences,
2. Frank-Zadoff-Chu sequences,
3. Sequences that result from invariance operations from the sequences referenced under 1. and 2.,
4. Sequences that result from DFT or IDFT from the sequences referenced under 1.-3.,
5. Sequences that result by invariance operations from the sequences referenced under 4.

The sequences according to 1. and 2. are specified more precisely in Section 3.4 of Annex 2. The invariance operations are defined in Section 3.7 of Annex 2. The DFT and IDFT of sequences are explained in Section 3.6 of Annex 2.

Sequences for LC spreading on the basis of sequences with good periodic autocorrelation are suggested below according to a further embodiment. These sequences satisfy conditions 1. and 3. According to this embodiment, sequences with good periodic autocorrelation function (PACF) are used as LC-spreading sequence u, e.g. the following sequences:
1. Binary m sequences,
2. Binary Legendre sequences,
3. Binary generalized Sidelnikov sequences,
4. Twin-Prime sequences,
5. Barker sequences,
6. Quadriphase Legendre sequences,
7. Quadriphase generalized Sidelnikov sequences,
8. Quadriphase complement-based sequences,
9. Quadriphase Lee sequences,
10. Sequences that result from the sequences referenced under 1.-9. by means of invariance operations.

The sequences according to 1.-9. are specified more precisely in Section 3.5 of Annex 2. The invariance operations are defined in Section 3.7 of Annex 2.

The inverse operation to the LC base spreading w=Uq, the LC base spreading, is generally given by $$q=U^{-1}w$$

$U^{-1}$ is a diagonal matrix, the main diagonal entries of which are given by $$[U^{-1}]_{nn} = \frac{1}{u_n}.$$

The following applies for uniform LC spreading sequences $$q=U^H w = \text{diag}(u^*) \cdot w.$$

All of the LC spreading sequences suggested above are uniform.

LC base spreading is shown mathematically as a multiplication with the LC base spreading matrix U with the input vector q. Since U is a diagonal matrix, this corresponds to the element-wise multiplication of vectors q and u. If a binary LC-spreading sequence is used, only sign reversals in the input vector q are may be used.

The matrix $U^{-1}$ or $U^H$ for LC base despreading is likewise a diagonal matrix and the operation can be realized by element-wise multiplication with the vector $$\left(\frac{1}{u_1}, \frac{1}{u_2}, \ldots, \frac{1}{u_N}\right)$$

or $u^*$. With the use of a binary LC spreading sequence, $u^*=u$ applies and only sign reversals may be used. However, it should be noted that this form of LC base despreading in the receiver of a transmission system can be used only if a channel equalization has already been carried out. In OFDM systems this is not usually carried out until after the DFT, so that in a system with LC spreading in general the same receiver structure is used as in the matrix spreading methods (as is later the case e.g. based on the embodiment shown in FIG. 7). To this end, the equivalence relation described later can be used.

The described form of LC spreading is not described in conventional technology. Due to the changed structure of the overall transform, it represents a completely new form of spreading in OFDM systems.

LC base spreading as a core operation can be described by means of multiplication of the signal vector according to the IDFT with a diagonal matrix. This corresponds to an element-wise multiplication of the signal vector with the LC spreading sequence (Hadamard product).

In general, thus only N multiplications may be used for the spreading. The computing power can be further reduced by selecting an LC sequence with low phase number. The simplest case results with the use of a binary sequence. The complex multiplications are then simplified to sign reversals, which can be realized with minimal effort (e.g. change of an individual bit). Since the spreading allocation is to be realized by the correct addressing of storage cells, in the simplest case an effort of O(N) simplest operations results.

In contrast, the most efficient method described in conventional technology with full flexibility regarding partial loading, namely the Walsh-Hadamard spreading, involves N log (N) additions/subtractions. LC spreading in principle can be used for all spreading lengths—(wherein it should be noted that the sequences given above if applicable can be constructed only for certain lengths). According to embodiments, LC-spreading is used above all for large spreading lengths, since then the highest efficiency as well as the largest saving in complexity result.

The low complexity results in the above-mentioned advantages C1 and C2 compared to OFDM systems with spreading on the basis of known spreading methods.

Figure 7:
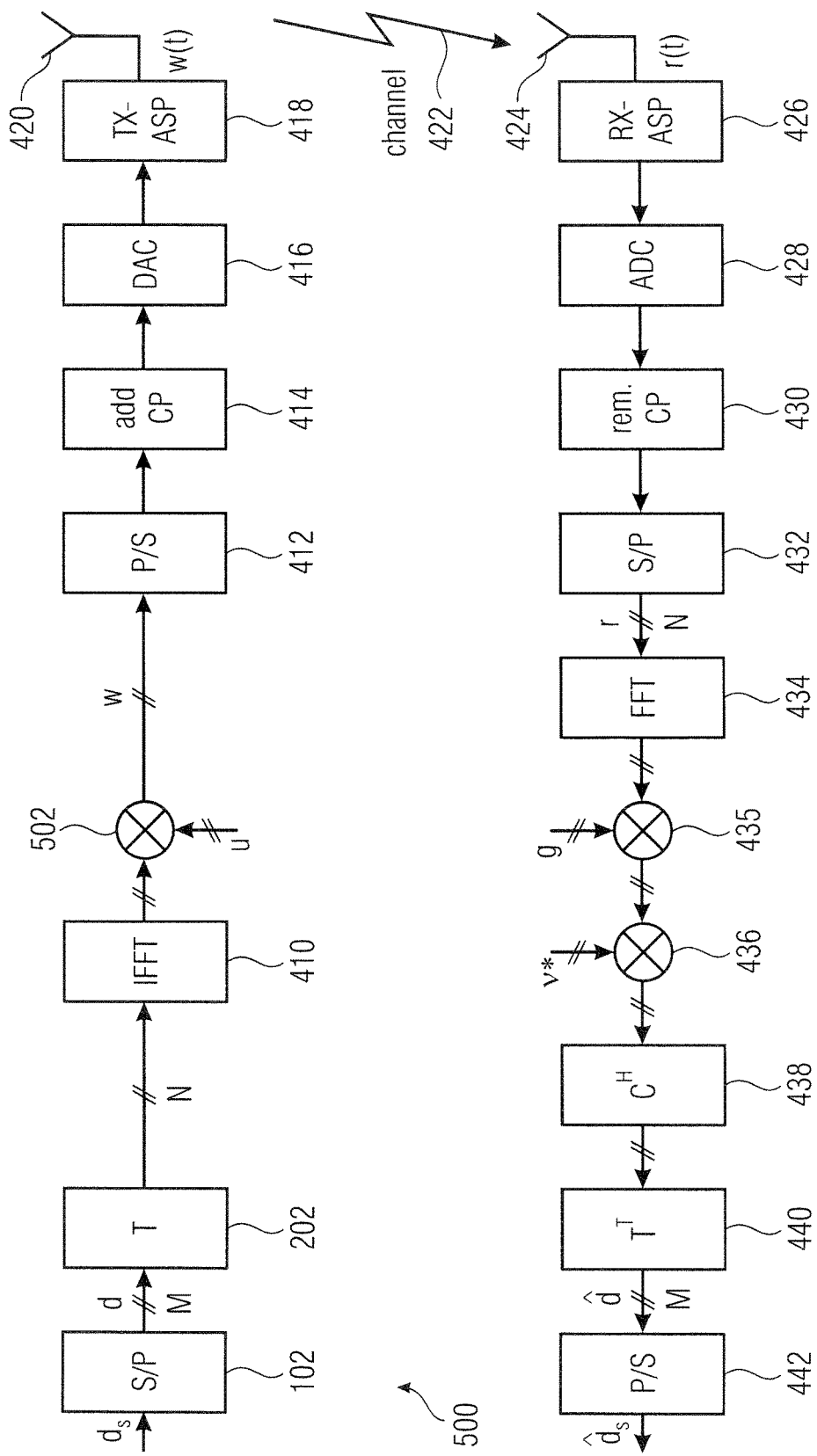
FIG. 7 shows an embodiment of a transmission system with a transmitter and a receiver, which operate according to embodiments of the second aspect of the invention (LC spreading)

An embodiment for a transmitter and a receiver for LC spreading is described below based on FIG. 7. FIG. 7 shows a transmission/reception chain 500, the reception chain of which corresponds to that in FIG. 3. All blocks of the transmission chain, which are not connected to the spreading itself, correspond to the blocks of the transmission chain in FIG. 3.

In the transmitter the (optionally already coded) transmission symbol stream $d_s$ is converted with the serial/parallel converter• 102 into transmission vectors of the length M. The block 202 carries out the spreading allocation and delivers vectors of the length N at the output. After the IFFT in the block 410 the LC base spreading takes place in the multiplier 502 by means of element-wise multiplication with the LC spreading sequence u and subsequently a parallel/serial conversion in the block 412. A cyclic prefix (CP) is added to the signal in block 414. This is followed by the digital-to-analog conversion in block 416 and the analog part of the transmitter 418, which comprises all of the components that may be used for the implementation of the signal in the radio frequency range (for example, filter, amplifier, mixer). The output signal w(t) is emitted via antenna 420.

After the transmission via the radio channel, the signal r(t) is received by the receiver antenna 424 and fed to the analog part of the receiver 426, which comprises all of the components that may be used for retrieving the baseband signal from the radio frequency signal (for example, filter, amplifier, mixer). The analog-to-digital converter 428 converts the analog signal into a digital signal. Subsequently, the cyclic prefix is removed (Block 430) and a serial/parallel conversion of the signal to received vectors r of the length N takes place in block 432. This is followed by the FFT in block 434 and channel equalization, which is shown as element-wise multiplication with the vector g (equalizer vector). With the aid of an element-wise multiplication, the randomization carried out in the transmitter is reversed again (in the example shown, by new randomization with the sequence v*) by the multiplication unit 436. This is followed by the despreading in block 438, the selection of the symbol vectors of the length M in block 440 and the parallel/serial conversion in block 442. At its output there is finally the data stream of the estimated symbols d̂. If FEC is used in the system, these are still symbols with channel coding, which are subsequently fed to the channel decoder (on a symbol level or bit level).

A partially loaded system (M=4) with 16 subcarriers (N=16) is considered below. The spreading allocation matrix is selected as follows:

$$T = T_{rake} = \begin{pmatrix} 1 & 0 & 0 & 0 \\ 0 & 0 & 0 & 0 \\ 0 & 0 & 0 & 0 \\ 0 & 0 & 0 & 0 \\ 0 & 1 & 0 & 0 \\ 0 & 0 & 0 & 0 \\ 0 & 0 & 0 & 0 \\ 0 & 0 & 0 & 0 \\ 0 & 0 & 1 & 0 \\ 0 & 0 & 0 & 0 \\ 0 & 0 & 0 & 0 \\ 0 & 0 & 0 & 0 \\ 0 & 0 & 0 & 1 \\ 0 & 0 & 0 & 0 \\ 0 & 0 & 0 & 0 \\ 0 & 0 & 0 & 0 \end{pmatrix}$$

A binary Sidelnikov sequence of the length N=16 is used as the LC spreading sequence u:

$$u=(+1,+1,+1,+1,-1,+1,-1,-1,+1,+1,-1,-1,-1,-1,+1,-1)^T.$$

To carry out the LC base spreading (element-wise multiplication of the input vector with the LC spreading sequence), only sign reversals in the elements of the input vector may be used. To calculate the equalization vector g in the receiver—regardless of the channel properties—known methods can be used. One possibility, for example, is the calculation via the MMSE criterion (see Reference [1]).

The despreading is carried out by multiplication with $C^H$. C thereby results from $C=C_{eq}=\mathrm{circ}(c_{eq})$ with $$c_{eq} = \frac{1}{\sqrt{N}} Fu = \frac{1}{\sqrt{N}} DFT(u)$$

The selection of the symbol vectors is finally carried out by multiplication with the matrix $T^T$.

Simulation results are explained in greater detail below. The efficiency of the LC spreading was investigated by simulation. An exemplary simulation result is shown below in comparison with other spreading methods. It corresponds to the embodiment according to FIG. 7, wherein M and N were scaled with the factor 16 with respect to a practical system.

Figure 8:
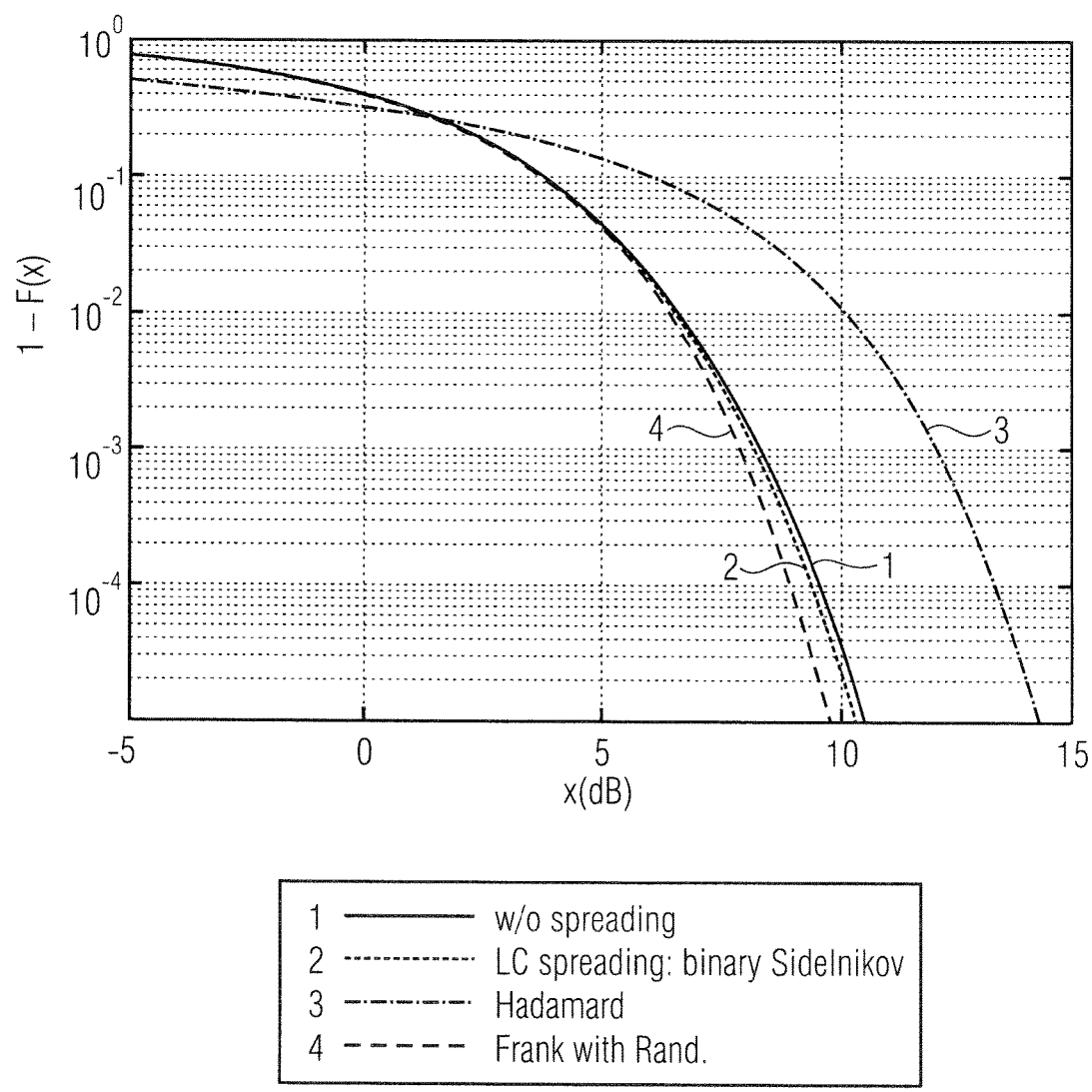
FIG. 8 shows a graph, which displays signal statistics for various known spreading methods and spreading methods according to embodiments of the second aspect of the invention.

The signal statistics in LC spreading with a binary Sidelnikov sequence as LC spreading sequence is shown in FIG. 8. For comparison, the curves are given without spreading ("w/o Spreading"), with conventional Hadamard spreading ("Hadamard") and the sequence-based matrix-spreading with a Frank sequence as spreading sequence including randomization with randomization sequence $v=v_{frank,frank}$ ("Frank Rand."). The systems are partially loaded with M=64 QPSK data symbols on N=256 OFDM subcarriers. The signal statistics in the example shown with the LC spreading (curve 2) is much better than with the conventional Hadamard spreading and even slightly better than without spreading (curve 1). Compared to the sequence-based matrix spreading with a Frank sequence as spreading sequence including randomization with the randomization sequence $v=v_{frank,frank}$ (best signal statistics in the comparison according to the first aspect—see FIG. 4) it performs somewhat better (by approx. 0.5 dB at $1-F(x)=10^{-4}$).

Figure 9:
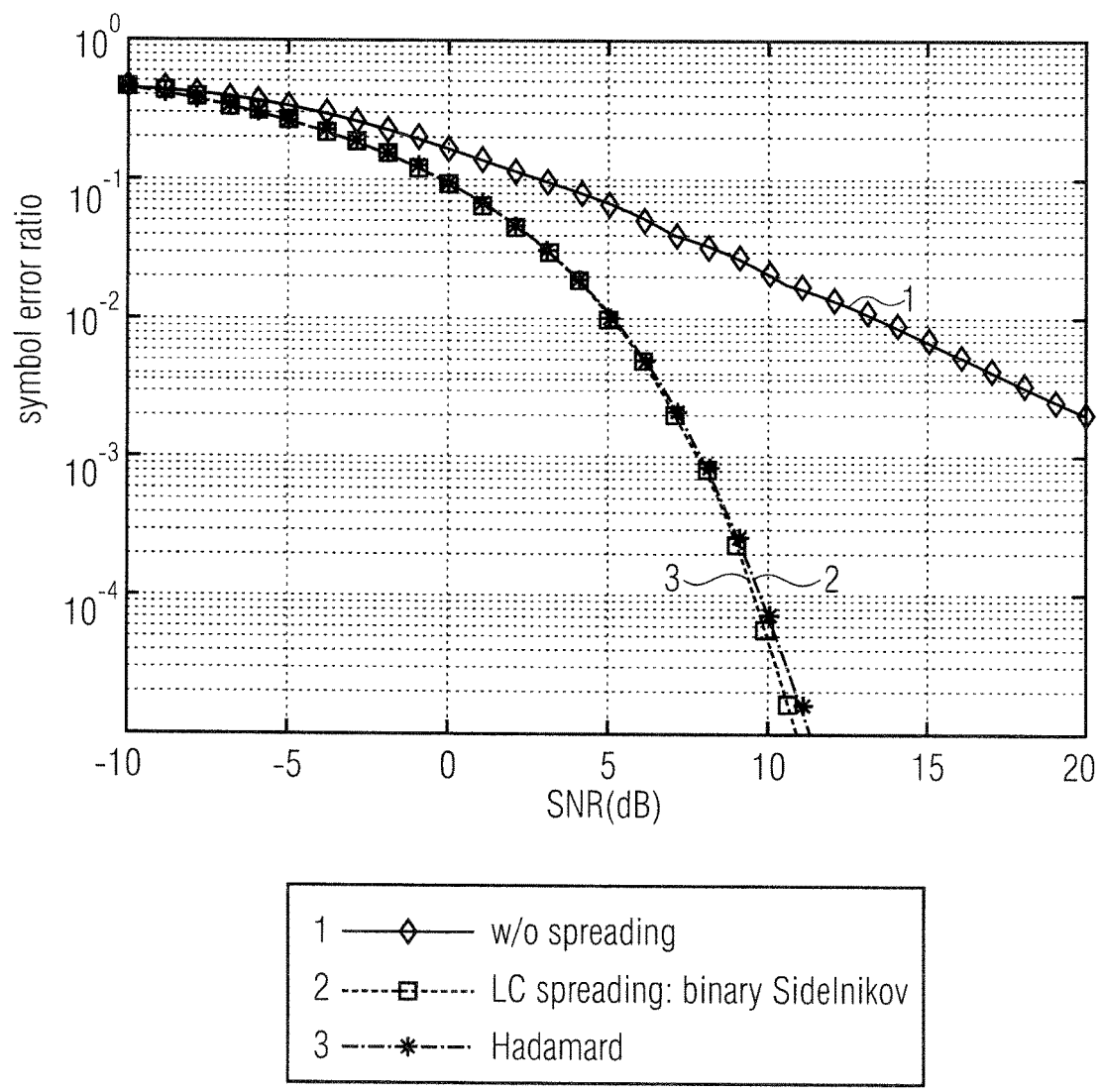
FIG. 9 shows a graph, which illustrates the symbol error rate (SER) of LC spreading with a binary Sidelnikov sequence as LC spreading sequence according to one embodiment of the second aspect of the invention, in comparison to known spreading methods.

FIG. 9 shows the SER results of the LC spreading with a binary Sidelnikov sequence as LC spreading sequence with the corresponding simulation parameters compared to the results of other spreading methods. The transmission signals were transmitted via a frequency-selective channel (subcarrier with independent Rayleigh fading) with AWGN. An MMSE channel equalization with perfect channel knowledge was carried out at the receiver. In this case the LC spreading has the same efficiency as the conventional Hadamard spreading. However, since it performs much better regarding signal statistics, for example with the same power consumption of the transmitter amplifier a higher SNR can be achieved at the receiver or for the same SNR the power consumption can be reduced.

It should furthermore be noted that the complexity of the LC spreading (on the transmitter side) is much lower compared to the Hadamard spreading. The FWHT can be omitted. Only an element-wise multiplication of the output vector of the IDFT with the LC spreading sequence may be used for this. In the given example (the LC spreading sequence is a binary sequence) this operation is reduced to sign reversal. In the example, somewhat better signal statistics can be achieved with the sequence-based matrix spreading on the basis of a Frank sequence and randomization. However, it is associated with a higher complexity.
(Spreading-Allocation-Division Multiplexing)

One possibility of supporting several users in the downlink case lies in the use of user-specific spreading allocation matrices. The method was described above as SADM for the matrix spreading according to the first aspect of the invention and can also be used in LC spreading. It should be noted that FDM or FDMA in the described form are not supported in the LC spreading.

The described SADM renders possible the support of several users in the downlink case and is not described in conventional technology in connection with known spreading methods. According to the invention, it is considered in connection with the new LC spreading, wherein randomization is not used with the LC spreading. SADM also makes it possible in the case of multiple users to have the same diversity gains as in the case of a single user. Only the spreading allocation is user-specific. Even in the case of several users, only an LC base spreading needs to be carried out. In an implementation this means that only a corresponding assignment of the data symbols of the users to the inputs of the IDFT needs to be carried out (correct addressing of storage cells). The additional effort for the spreading operation is thus negligible compared to the case of a single user.
(Time-Division Multiplexing/Time Division Multiple Access)

To support several users, all of the described spreading methods can be combined with TDM (downlink) or TDMA (uplink). The same diversity gains are achieved as in the case of a single user. The same spreading can be carried out for each user or by each user. Different rate requirements and an adaptive transmission can be covered by the variation of the user-specific transmission length.

The TDM method or TDMA method is described in conventional technology, although it should be noted that the LC spreading can be used in connection with TDM or TDMA.
(Connection Between LC Spreading—Second Aspect—and Sequence-Based Matrix Spreading Methods—First Aspect)

As already mentioned, there is a direct connection between the LC spreading according to the second aspect of the invention and the sequence-based matrix spreading methods according to the first aspect of the invention. The LC spreading represents the implementation of sequence-based spreading methods with lowest complexity. It can be used on the transmitter side for all sequence-based spreading methods that do not use randomization (the randomization matrix corresponds to the unit matrix: V=I). The equivalent sequence-based matrix spreading method to the LC spreading with the LC spreading sequence u is the spreading with the aid of the base spreading sequence $$c_{eq} = \frac{1}{\sqrt{N}} Fu = \frac{1}{\sqrt{N}} DFT(u)$$

equivalent to u, wherein F is the DFT matrix (see also Section 2.10 of Annex 2). The scaling factor $$\frac{1}{\sqrt{N}}$$

results in connection with the definition of the DFT matrix in Section 2.10 of Annex 2 or the definition of DFT in Section 3.6 in Annex 2. If other prefactors are used in the definitions, the scaling factor can have other values or also be omitted. The base spreading matrix $C_{eq}$ equivalent to the LC spreading sequence u results according to Section 2.3 of Annex 2 from $$C_{eq} = \text{circ}(c_{eq})$$

Conversely, the LC spreading equivalent to a sequence-based matrix spreading method with the base spreading sequence c is based on that LC spreading sequence that results from IDFT (and scaling) from c:

$$u_{eq} = \sqrt{N} F^{-1} c = \sqrt{N} \cdot \text{IDFT}(c).$$

As was explained above, the LC despreading generally cannot be used in practice. A receiver structure as with the (sequence-based) matrix spreading method (first aspect) may be used in order to shift the channel equalization before the despreading. The matrix for base despreading results from the spreading matrix $C=C_{eq}$, as described above.

Although some aspects have been described in connection with a device, naturally these aspects also represent a description of the corresponding method, so that a block or a component of a device is also to be understood as a corresponding process step or as a feature of a process step. Analogously thereto, aspects that have been described in connection with or as a process step, also represent a description of a corresponding block or detail or feature of a corresponding device.

Depending on specific implementation requirements, embodiments of the invention can be implemented in hardware or in software. The implementation can be carried out using a digital storage medium, for example, a floppy disk, a DVD, a Blu-ray disk, a CD, a ROM, a PROM, an EPROM, an EEPROM or a flash drive, a hard drive or another magnetic or optical storage means, on which electronically readable control signals are stored, which can interact or interact with a programmable computer system such that the respective method is carried out. The digital storage medium can thus be computer-readable. Some embodiments according to the invention thus comprise a data storage medium that has electronically readable control signals that are able to interact with a programmable computer system such that a method described herein is carried out.

In general embodiments of the present invention can be implemented as a computer program product with a program code, wherein the program code is effective in carrying out one of the methods when the computer program product runs on a computer. The program code can also be stored on a machine-readable carrier, for example.

Other embodiments comprise the computer program for carrying out one of the methods described herein, wherein the computer program is stored on a machine-readable carrier.

In other words, an embodiment of the method according to the invention is thus a computer program that has a program code for carrying out one of the methods described herein, when the computer program runs on a computer. A further embodiment of the method according to the invention is thus a data carrier (or a digital storage medium or a computer-readable medium), on which the computer program is recorded to carry out one of the methods described herein.

Another embodiment of the method according to the invention is thus a data stream or a sequence of signals, that represents the computer program for carrying out one of the methods described herein. The data stream or the sequence of signals can be configured, for example, to be transferred via a data communications connection, for example, via the Internet.

Another embodiment comprises a processing device, for example, a computer or a programmable logic module, which is configured or adapted to carry out one of the methods described herein.

A further embodiment comprises a computer, on which the computer program is installed for carrying out one of the methods described herein.

In some embodiments, a programmable logic module (for example, a field-programmable gate array, a FPGA) can be used to carry out some or all of the functionalities of the methods described herein. In some embodiments a field-programmable gate array can interact with a microprocessor in order to carry out one of the methods described herein. In general the methods in some embodiments are carried out by any hardware device. This can be universally applicable hardware such as a computer processor (CPU) or hardware specific for the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

ANNEX 1: LITERATURE

[1] M. Al-Mahmoud, M. D. Zoltowski, "Performance Evaluation of Code-Spread OFDM", 46*th* Annual Allerton Conference, UIUC, Illinois, USA, Sep. 23-26, 2008.

[2] A. Serener, N. Balasubramaniam, D. M. Gruenbacher, "Performance of Spread OFDM with LDPC Coding in Outdoor Environments", *IEEE* 58*th Vehicular Technology Conference, VTC* 2003-*Fall,* 2003.

[3] V. Nangia, K. L. Baum, "Experimental Broadband OFDM System: Field Results for OFDM and OFDM with Frequency Domain Spreading", *IEEE* 56*th Vehicular Technology Conference, VTC* 2002-*Fall,* 2002.

[4] M. Al-Mahmoud, M. D. Zoltowski, "Performance Evaluation of Code-Spread OFDM Using Vandermonde Spreading", *IEEE Radio and Wireless Symposium, RWS*'09, 2009.

[5] A. Bury, J. Egle, J. Lindner, "Diversity Comparison of Spreading Transforms for Multicarrier Spread Spectrum Transmission", IEEE *Transactions on Communications*, vol., 51, pp. 774-781, 2003.

[6] http://chaos.if.uj.edu.pl/~karol/hadamard/.

[7] R. Frank, S. Zadoff, R. Heimiller, "Phase Shift Pulse Codes with Good Periodic Correlation Properties", IRE Transactions on Information Theory (Corresp.), vol. 8, pp. 381-382, 1962.

[8] H. D. Lüke, "Korrelationssignale", Springer-Verlag, 1992.

[9] H. D. Lüke, H. D. Schotten, H. Hadinejad-Mahram, "Binary and Quadriphase Sequences With Optimal Autocorrelation Properties: A Survey", *IEEE Transactions on Information Theory,* vol. 49, no. 12, pp. 3271-3282, 2003.

[10] H. D. Schotten, "New Optimum Ternary Complementary Sets and Almost Quadriphase, Perfect Sequences", *International Conference on Neural Networks and Signal Processing (ICNNSP*'95), Nanjing, China, pp. 1105-1109, December 1995.

[11] H. D. Schotten, "Optimum Complementary Sets and Quadriphase Sequences Derived from q-ary m-sequences", IEEE *International Symposium on Information Theory (ISIT*'97), Ulm, Germany, p. 485, 1997.

[12] M. Schroeder, "Number Theory in Science and Communication", Springer-Verlag, 1989.

[13] A. M. Boehmer, "Binary Pulse Compression Codes", *IEEE Transactions on Information Theory,* vol. 13, no. 2, pp. 156-167, April 1967.

[14] A. Lempel, M. Cohn, W. Eastman, "A Class of Balanced Binary Sequences with Optimal Autocorrelation Properties", *IEEE Transactions on Information Theory*, vol. 23, pp. 38-42, January 1977.

[15] S. W. Golomb, L. D. Baumert, M. F. Easterling, J. J. Stiffler, A. J. Viterbi, "Digital Communications with Space Applications", Prentice Hall, 1964.

[16] D. Galda, H. Rohling, "A Low Complexity Transmitter Structure for OFDM-FDMA Uplink Systems", 55*th Vehicular Technology Conference, VTC-Spring,* 2002.

[17] I. Gohberg, V. Olshevsky, "Fast Algorithms with Preprocessing for Matrix-Vector Multiplication Problems", *Journal of Complexity*, vol. 10, no. 4, pp. 411-427, 1994.

[18] G. Golub, C. Van Loan', "Matrix Computations", The Johns Hopkins University Press, Baltimore, 3rd edition, 1996.

[19] R. Frank, S. Zadoff, R. Heimiller, "Phase Shift Pulse Codes with Good Periodic Correlation Properties", *IRE Transactions on Information Theory,* vol. 8, pp, 381-382, 1962.

[20] D. Chu, "Polyphone Codes with Good Periodic Correlation Properties", *IEEE Transactions on Information Theory*, vol. 18, p.p. 531-532, 1972.

[21] M. L. McCloud, "Analysis and design of short block OFDM spreading matrices for use on multipath fading channels," *IEEE Transactions on Communications*, vol. 53, pp. 656-665, 2005.

ANNEX 2: DEFINITIONS (1) Symbols

The imaginary element is symbolized by j: $j^2=-1$ or $j=\sqrt{-1}$. Lowercase letters in italics (e.g. a) denote complex-valued or real-valued variables, uppercase letters in italics (e.g. A) denote complex or real-valued constants, and bold uppercase letters in italics (e.g. A) denote complex-valued or real-valued matrices. Bold lowercase letters in italics (e.g. a) stand for vectors. Vectors are regarded as matrices with only one row (row vectors) or one column (column vectors). Access to the nth element of a vector a is shown by $[a]_n$. The following holds $[a]_n = a_n$, if the vector is defined as $a = (a_1, a_2, \ldots, a_N)$.

The dimension of a matrix with N rows and M columns is N×M. $[A]_{nm}$ describes the access to the element of the nth row and mth column of the matrix A. A matrix of the dimension N×M, the elements of which are all 1 (unitary matrix), is represented by $1_{NM}$. Accordingly, $1_{1M}$ denotes a row vector and $1_{N1}$ denotes a column vector of the length M or N, which is composed only of ones. A matrix of the dimension N×M, the elements of which are all 0 (zero matrix), is shown by $0_{NM}$. Accordingly, $0_1 M$ denotes a row vector and $0_{N1}$ denotes a column vector of the length M or N, which is composed only of zeros.

The transpose of matrix A is symbolized by $A^T$ the adjugate (hermitially conjugated) matrix is symbolized by $A^H$. $A^{-1}$ denotes the inverse matrix of A. $a^T$ is the transposed vector and $a^H$ is the adjugate (hermitially conjugated) vector of a. The conjugated vector of a. is symbolized by a*. ‖a‖ is die Euclidean norm of the vector a.

AB or A·B expresses the multiplication of the matrix A with the matrix B (matrix product). The matrix product is also used with the multiplications of matrices with vectors, that is, for example, Ab (means the same as A·b). Likewise ab or a·b symbolize the matrix product between the vectors a and b. If a is a row vector and b is a column vector, this is the scalar product between the two vectors. However, it becomes the "dyadic product" or "tensor product", when a is a column vector and b is a row vector.

The Hadamard product is represented by ∘ (e.g. A∘B), the Kronecker product by ⊗ (e.g. A⊗B). The Hadamard product corresponds to the element-wise multiplication of matrices (and vectors) of the same dimension.

For clear illustration and better legibility, indices where relevant are separated by commas, that is, for example $[a]_{N-1,M}$ for access to the element of the vector in the (N−1)th row and the M-th column.

N stands for the quantity of natural numbers, Z for the quantity of whole numbers and R for the quantity of real numbers. R⁺ symbolizes the quantity of positive real numbers (without zero).

The modulo operation (a mod m) calculates the remainder of the division of $$\frac{a}{m}:$$

$$(a \bmod m) := a - \left\lfloor \frac{a}{m} \right\rfloor \cdot m,$$

where ⌊•⌋ denotes the largest whole number that is smaller than or equal to the number in parentheses. If two numbers a and b have the same remainder, that is, a mod m=b mod m, a is described as congruent to b mod N and one writes (see Reference [8])

$a \equiv b \bmod m.$

The effort of algorithms (number of operations, running time) as a function of the input variable n is estimated to the maximum via symptotic behavior (n→∞) of the cost function with the aid of a function g(n). For this the usual description with the aid of the Landau symbol O is used: O(g)

(2) Matrices

In this section the properties of matrices are defined that are referred to in the specification. A matrix A of the dimension N×M has the form:

$$A = \begin{pmatrix} a_{1,1} & a_{1,2} & \cdots & a_{1,M} \\ a_{2,1} & a_{2,2} & \cdots & a_{2,M} \\ \vdots & \vdots & \ddots & \vdots \\ a_{N,1} & a_{N,2} & \cdots & a_{N,M} \end{pmatrix}$$

With this definition of the matrix A the following holds $[A]_{nm} = a_{nm}$.

(2.1) Square Matrices

A matrix A of the dimension N×M is called square, if the following holds: N=M. Therefore the number of rows is identical to the number of columns. The elements $a_{nm}$, which are in the diagonal from top left to bottom right, are called main diagonal entries.

(2.2) Diagonal Matrices

A square matrix A is called a diagonal matrix, if only the main diagonal entries are different from zero: $[A]_{nm}=0$, if m≠n ∀ m, n=1 . . . N. A diagonal matrix A can be defined fully via a vector $a=(a_1, a_2, \ldots, a_N)$, the elements of which give the main diagonal entries of the matrix. One writes:

$$A = \text{diag}(a) = \begin{pmatrix} a_1 & 0 & \cdots & 0 \\ 0 & a_2 & \cdots & \vdots \\ \vdots & \vdots & \ddots & 0 \\ 0 & \cdots & 0 & a_N \end{pmatrix}$$

(2.3) Unit Matrix

The unit matrix $I_N$ is a square matrix of the dimension N×N, the main diagonal of which has only ones. All of the other entries are 0 (diagonal matrix). $I_3$ for example is given by $$I_3 = \begin{pmatrix} 1 & 0 & 0 \\ 0 & 1 & 0 \\ 0 & 0 & 1 \end{pmatrix}$$

(2.4) Circulant Matrices

A circulant matrix A of the dimension N×N has the form $$A = \begin{pmatrix} a_1 & a_N & a_{N-1} & \cdots & a_2 \\ a_2 & a_1 & a_N & \cdots & a_3 \\ a_3 & a_2 & a_1 & \cdots & a_4 \\ \vdots & \vdots & \vdots & \ddots & \vdots \\ a_N & a_{N-1} & a_{N-2} & \cdots & a_1 \end{pmatrix}$$

This is a special Toeplitz matrix, in which each row vector is shifted cyclically relative to the row vector above it by one entry to the right. Likewise, each column vector in comparison to the column vector to the left is shifted cyclically by one entry downwards. A circulant matrix A can be fully specified by the vector $a=(a_1, a_2, \ldots, a_N)$, which occurs as column vector $a^T$ in the first column of the matrix. The generation of the circulant matrix A from the vector a or the sequence a is symbolized by the operation A=circ(a).

(2.5) Inverse of a Matrix

The inverse of a square matrix A is a matrix $A^{-1}$, so that the following applies $AA^{-1}=I$.

(2.6) Invertible/Regular Matrices

The rank of a matrix denotes the number of linearly independent rows (or columns). A matrix of the dimension N×N can have at most rank min(N, M). It then has "full rank." A square matrix A of the dimension N×N with full rank, that is, rank(A)=N, is referred to as an invertible or regular matrix.

(2.7) Orthogonal Matrices and Unitary Matrices

For a matrix A of the dimension N×M with pairs of orthogonal rows, the following applies $a_n a_l^T = 0 \ \forall n, l = 1 \ldots N, \ l \neq n$, where $a_n = (a_{n1}, a_{n2}, \ldots, a_{nM})$ represents the vector corresponding to the nth row. All of the rows of the matrix are in pairs orthogonal to one another. This is a matrix with orthonormal rows, if the following applies in addition:

$\|a_n\| = 1 \ \forall n = 1 \ldots N$.

For a matrix B of the dimension N×M with orthogonal columns in pairs, it applies accordingly $b_m^T b_k = 0 \ \forall m, k = 1 \ldots M, \ k \neq m$ where $b_m = (b_{1m}, b_{2m}, \ldots, b_{Nm})^T$ represents the vector corresponding to the mth column. All of the columns of the matrix are in pairs orthogonal to one another. This is a matrix with orthonormal columns if the following applies in addition:

$\|b_m\| = 1 \ \forall n = 1 \ldots M$.

A square, real matrix Q, the row vectors and column vectors of which are orthonormal in pairs, is referred to as an orthogonal matrix. It holds $QQ^T = Q^T Q = I$ and $Q^{-1} = Q^T$.

Unitary matrices are the complex analogue of orthogonal matrices. A unitary matrix U is a square matrix; which satisfies the condition:

$UU^H = U^H U = I$

This is synonymous with the condition $U^{-1} = U^H$.

A unitary matrix is a matrix with orthonormal rows and columns in pairs.

Note:

Every orthogonal matrix is at the same time a unitary matrix with real coefficients. The quantity of orthogonal matrices is therefore a subset of the unitary matrices. If the present specification refers to unitary matrices, it is not required for the coefficients thereof to be complex-valued and orthogonal matrices are included.

(2.8) Hadamard Matrices

A (real) Hadamard matrix H of order N is a matrix of the dimension N×N with elements of $\{1, -1\}$, which satisfies the condition $HH^T = N \cdot I$. Real Hadamard matrices can exist only for N=1, N=2 or N=4k with k∈N.

A "generalized" or "complex" Hadamard matrix $\tilde{H}$ of order N is a matrix of the dimension N×N, which satisfies the two following conditions:

$|[\tilde{H}]_{nm}| = 1 \ \forall n, m = 1, 2, \ldots N$, $\tilde{H}\tilde{H}^H = N \cdot I$ The referenced conditions are referred to in this document as "Hadamard conditions." The second condition is equivalent to $$\tilde{H}^{-1} = \frac{1}{N} \tilde{H}^H$$

Real Hadamard matrices are a subset of the generalized (complex) Hadamard matrices. Generalized Hadamard matrices are closely connected to unitary matrices. Each generalized Hadamard matrix $\tilde{H}$ can be converted into a unitary matrix with the aid of a division by $\sqrt{N}$:

$$U = \frac{1}{\sqrt{N}} \tilde{H}$$

and accordingly:

$\tilde{H} = \sqrt{N} \cdot U$

The former relation also applies to real Hadamard matrices:

$$U = \frac{1}{\sqrt{N}} H$$

The matrix U is then likewise real and thus an orthogonal matrix. However, the second relation is not applicable. Even if U is a real matrix (orthogonal matrix), the last equation $\tilde{H} = \sqrt{N} \cdot U$ generally does not produce a matrix with elements of $\{1, -1\}$ and thus by definition not a real Hadamard matrix, but only a generalized Hadamard matrix with real elements.

(2.9) Vandermonde Matrices

A Vandermonde matrix X is a square matrix of the form $$X = \begin{pmatrix} 1 & x_1 & x_1^2 & \ldots & x_1^{N-1} \\ 1 & x_2 & x_2^2 & \ldots & x_2^{N-1} \\ 1 & x_3 & x_3^2 & \ldots & x_3^{N-1} \\ \vdots & \vdots & \vdots & \ddots & \vdots \\ 1 & x_N & x_N^2 & \ldots & x_N^{N-1} \end{pmatrix}$$

It is fully described by the vector or the sequence $(x_1, x_2, \ldots, x_N)^T$. Only regular Vandermonde matrices are of interest in the present case. A Vandermonde matrix is regular when the $x_n$ are different in pairs.

Note:

In the literature the transpose of matrix X is sometimes also defined as the Vandermonde matrix. In the present case it is irrelevant which definition is used. The term "Vandermonde matrix" covers both versions.

(2.10) DFT and IDFT Matrix

The DFT matrix F is defined as $$F = \frac{1}{\sqrt{N}} \begin{pmatrix} 1 & 1 & 1 & 1 & \ldots & 1 \\ 1 & \omega & \omega^2 & \omega^3 & \ldots & \omega^{N-1} \\ 1 & \omega^2 & \omega^4 & \omega^6 & \ldots & \omega^{2(N-1)} \\ 1 & \omega^3 & \omega^6 & \omega^9 & \ldots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \ldots & \omega^{(N-1)(N-1)} \end{pmatrix}$$

where:

$$\omega = e^{-\frac{2\pi j}{N}}, j = \sqrt{-1}$$

The IDFT matrix $F^{-1}$ is the inverse of the DFT matrix. Since F is unitary, the following applies $F^{-1} = F^H$. The DFT matrix as well as the IDFT matrix is special Vandermonde matrices which (with the above definition) are scaled only with the factor $$\frac{1}{\sqrt{N}}.$$

(3) Sequences

A sequence $\{s(n)\}$ of the length N is defined by its elements $s(n)$:

$$s(n), n=0,1,\ldots,N-1, s(n) \in C.$$

In this document, sequences are also interpreted as column vectors. The column vector $s=(s_1, s_2, \ldots, s_N)^T$ corresponding to the sequence $\{s(n)\}$ results from the assignment $s_n = s(n-1), n=1, 2, \ldots, N$. Simplified, $s(n)$ is also used to refer to the sequence $\{s(n)\}$, if the reference is clear from the context. The energy E of a sequence $s(n)$ is given by:

$$E = \sum_n |s(n)|^2.$$

(3.1) Periodic Autocorrelation Function

The periodic autocorrelation function (PACF) of the sequence $s(n)$ is defined as $$\varphi_{ss}(m) = \sum_{n=0}^{N-1} s^*(n) s((n+m) \bmod N).$$

The following applies $$\varphi_{ss}(0) = E.$$

If the following applies for a sequence $$\varphi_{ss}(m) = 0 \quad m \neq 0 \bmod N$$

this is referred to as a sequence with "perfect (periodic) autocorrelation," a sequence with "perfect PACF," or also as a "perfect sequence."

To evaluate the correlation quality of nonperfect sequences, the following two measures are used: the largest sidelobe in terms of amount of PACF $\Theta$, which according to Reference [9] is given by $$\Theta = \max_{m \neq 0 \bmod N} |\varphi_{ss}(m)|,$$

and the merit factor M, which is defined as follows according to Reference [9]:

$$M = \frac{\varphi_{ss}^2(0)}{\sum_{m=1}^{N-1} |\varphi_{ss}(m)|^2}.$$

The merit factor describes the ratio between the energy contained in the main lobe and that in the sidelobes of the PACF.

Sequences for which (compared to other sequences with the same energy) $\Theta$ is as small as possible and M is as large as possible, are referred to as "sequences with good (periodic) autocorrelation." It can be shown that as a function of the length N and the extent of the alphabet of the sequence elements, a certain value of $\Theta$ cannot be fallen below (or of M cannot be exceeded) (see References [8], [9]). The sequence which for given N and given alphabet (possible values of the elements) reaches the optimum for both measurements, can be referred to as a sequence with optimal autocorrelation. Sequences with good autocorrelation can either have an optimal autocorrelation or the values that were achieved for $\Theta$ and M are close to the optimal values.

(3.2) Uniform Sequences

The elements of uniform sequences all have the amount one. They have the following form (see Reference [8]):

$$s(n) = \exp(j 2\pi \beta_n), n=0,1,\ldots,N-1.$$

If the phases $\beta(k)$ assume only values of P equidistant angles $$\beta(k) = \frac{k}{P},$$

k=0, 1, . . . , P−1

P is referred to as the phase number of the sequence. They are referred to as P-Phase sequences (see Reference [8]).

(3.3) Sequences with Fixed Phase Number

The one sequence of the length N is defined as $$s(n)=1, n=0,1,\ldots,N-1.$$

This is equivalent to the definition via the unit vector:

$$s = 1_{N1}$$

The one sequence is a uniform sequence where P=1.

Sequences for which the following applies are referred to here as binary sequences:

$$s(n) \in \{\pm 1\}.$$

Binary sequences are uniform sequences where P=2. Sequences where $$s(n) \in \{\pm 1, \pm j\}, j=\sqrt{-1}$$

are referred to as quadriphase sequences. These are uniform sequences where P=4.

The terms almost binary or almost quadriphase are used for sequences, the first element of which is 0, while all other elements are binary or quadriphase (see Reference [(9)]).
(3.4) Sequences with Perfect Periodic Autocorrelation
(3.4.1) Frank Sequences A Frank sequence of the length $N=M^2$, $M\epsilon N$, with the parameter p can be given by $$s_p(n) = \exp\left(j\frac{2\pi p}{\sqrt{N}}(n \bmod \sqrt{N})\left\lfloor\frac{n}{\sqrt{N}}\right\rfloor\right),$$

n=0, 1, . . . , N−1,
where p and M are be coprime. For p=1 this corresponds to the definition of a Frank sequence (see Reference [8]). If the control variables n=1, 2, . . . , N are used instead of n=0, 1, . . . , N−1, the above definition is equivalent to the definition in Reference [19].

The phase number of Frank sequences is P=M. Frank sequences can be constructed for all lengths N that represent a square number (N=4, 9, 16, 25, . . . ).
(3.4.2) Frank-Zadoff-Chu Sequences A Frank-Zadoff-Chu sequence of the length N with the parameter λ according to References [20], [8] can be given by $$s_\lambda(n) = (-1)^{\lambda n}\exp\left(\frac{j\pi n^2}{N}\right),$$

n=0, 1, . . . , N−1
where $gcd(\lambda, N)=1$ for $1 \leq \lambda < N$.

The phase number P is N for odd N and 2N for even N. Frank-Zadoff-Chu sequences can be constructed for all lengths.
(3.5) Sequences with Good Periodic Autocorrelation Function
(3.5.1) m-Sequences Linear maximum sequences/m-sequences in GF(2) (Galois field with two different elements) are considered. They can be described by primitive polynomials and generated with the aid of feedback shift registers (see Reference [8]). From the m-sequence $\{\check{s}(n)\}$, $\check{s}(n)\epsilon\{0,1\}$ results the "binary m-sequence" $\{s(n)\}$, $s(n)\epsilon\{\pm 1\}$, by replacing 0 by 1 and 1 by −1.

The following applies for the PACF of bipolar m-sequences:

$$\tilde{\varphi}_{ss}(m) = \begin{cases} N & m = 0 \bmod N \\ -1 & sonst \end{cases}$$

m-sequences can be constructed for all lengths $N=2^r-1$, $r\epsilon\{2, 3, 4, \ldots\}$.
(3.5.2) Legendre Sequences A Legendre sequence $\{s(n)\}$ with $s(n)\epsilon\{0,1,-1\}$ and binary PACF can be defined by (see Reference [12])

$$s(n) = n^{\frac{(p-1)}{2}} \bmod p$$

$p > 2 \text{ prim}, n=0,1, \ldots N-1$

Legendre sequences are almost binary sequences and exist for all lengths N=p, wherein p is a prime number. By replacing the leading 0 by a 1 (or −1) in Legendre sequences of the length N=p≡3 mod 4, prim, or N∈{3, 7, 11, 19, 23, 31, . . . }, binary sequences result (see Reference [8]), for the PACF of which applies:

$$\tilde{\varphi}_{ss}(m) = \begin{cases} p & m = 0 \bmod p \\ -1 & sonst \end{cases}$$

In the same manner binary Legendre sequences of the length N≡1 mod 4, prim, that is, N∈{5, 13, 17, 29, 37, . . . } can be constructed. The PACF thereof has sidelobes of 1 and −3. The sequences are referred to here as $L_1$-sequences or as "binary Legendre sequences." If the leading 0 is replaced by j (or −j), quadriphase sequences result (see Reference [9]). They are referred to as $L_j$-sequences or as quadriphase Legendre sequences.
(3.5.3) Twin-Prime Sequences/Jakobi Sequences The construction of twin-prime or Jakobi sequences is described, for example, in Reference [15]. These are binary sequences (here: $s_n\epsilon\{1, -1\}$), which exist for the lengths N=p(p+2), p prim, p+2 prim. For N∈{35, 143} the PACF has the sidelobes −1.
(3.5.4) Barker Sequences Barker sequences are binary sequences. They exist for the lengths N∈{2, 3, 4, 5, 7, 11, 13} and are listed, for example, in Reference [8].
(3.5.5) Generalized Sidelnikov Sequences Generalized Sidelnikov sequences (S-sequences, see Reference [9]) are almost binary sequences with a maximum sidelobe of Θ=2. They exist for the lengths $N=p^a-1$, p prim>2, a integer. Their construction is described in Reference [9]. By replacing the leading 0 by ±1, binary sequences can be derived from the almost binary S-sequences. They are referred to as $S_1$-sequences or binary Sidelnikov sequences. If the leading 0 is replaced by ±j, however, quadriphase sequences result. They are referred to as $S_1$-sequences or quadriphase Sidelnikov sequences.
(3.5.6) Lempel Sequences A construction specification for DC-free binary sequences of the length $N=p^k-1$, p prim>2, k∈N, N≡0 mod 4, that is, N∈{4, 8, 12, 16, 24, 28, 36, . . . } is given in Reference [14]. Their PACF sidelobes are 0 and −4. Furthermore, in Reference [14] a construction specification for sequences of the length $N=p^k-1$, p prim, k∈N, N≡2 mod 4, that is, N∈{6, 10, 18, 22, 26, 30, . . . } is described. In this case, the PACF sidelobes −2 and 2.
(3.5.7) Complement-Based Sequences Complement-based sequences (C sequences—see Reference [10], [11]) are quadriphase sequences of the length $$N = \frac{(p^a + 1)}{2} \equiv 1 \bmod 2,$$

p prim>2, a integer, with a maximum sidelobe Θ=1 and $M_\infty=N$ (see Reference [9]). They can be derived from pairs of periodic complementary sequences. The construction is described in References [10] and [11].

(3.6) Discrete Fourier Transform and Inverse Discrete Fourier Transform of Sequences A discrete Fourier Transform (DFT) of the sequence $\{s(n)\}$ results in a new sequence $\{s_{IDFT}(k)\}:=\text{DFT}(\{s(n)\})$. Its elements are calculated $$s^{DFT}(k) = \frac{1}{\sqrt{N}} \sum_{n=0}^{N-1} e^{-2\pi j \frac{nk}{N}} \cdot s(n),$$

$k=0, 1, \ldots, N-1$.

Likewise, inverse Fourier Transform (IDFT) of the sequence $\{s(n)\}$ results in a new sequence $\{s_{IDFT}(k)\}:=\text{IDFT}(\{s(n)\})$. Its elements are calculated $$s^{IDFT}(k) = \frac{1}{\sqrt{N}} \sum_{n=0}^{N-1} e^{2\pi j \frac{nk}{N}} \cdot s(n),$$

$k=0, 1, \ldots, N-1$.

The following holds $$\text{IDFT}(\text{DFT}(\{s(n)\}))=s(n)$$

and $$\text{DFT}(\text{IDFT}(\{s(n)\}))=s(n).$$

(3.7) Invariance Operations

By means of the transformation of a sequence s(n) another sequence š(n) can be derived. Transformations of sequences that do not affect the correlation properties, are referred to as invariance operations (see Reference [8]). This includes the following operations:
1. Shift by no elements: $\check{s}(n)=s((n-n_0) \bmod N)$;
2. Negate: $\check{s}(n)=-s(n)$,
3. Complex conjugate mirrors: $\check{s}(n)=s^*(-n)$,
4. Addition of a constant phase $\alpha$: $\check{s}(n)=e^{j\alpha}s(n)$,
5. Mirror: $\check{s}(n)=s(-n)$,
6. Conjugate complex: $\check{s}(n)=s^*(n)$,
7. Addition of a linear phase $$\frac{n}{x}: \check{s}(n) = e^{j2\pi n/x}s(n),$$

8. Alternation: $\check{s}(n)=(-1)^n s(n)$,
9. Multiplication with a complex prefactor: $\check{s}(n)=C \cdot s(n)$, $C \in \mathbb{C}$, $C \neq 0$.

Note: The operation under 9. contains the operations under 2. and 4. and is not listed under the invariance operations in Reference [8], since it changes the amount of the PACF values (scaling). Since this does not have any effect on the correlation properties, however, the operation here is likewise understood to be an invariance operation.

ANNEX 3: ABBREVIATIONS

AWGN Additive White Gaussian Noise
BER Bit Error Rate
BOFDM Block OFDM
CDM Code-Division Multiplexing
CS-OFDM Code-Spread OFDM
COFDM Coded OFDM
DAC Digital-to-Analog Converter
DVB-T Digital Video Broadcasting—Terrestrial
DAB Digital Audio Broadcasting
DMT Discrete Multitone Transmission
DFT Discrete Fourier Transform
FPGA Field Programmable Gate Array
FDMA Frequency-Division Multiple Access
FDM Frequency-Division Multiplexing
GI Guard Interval
IDFT Inverse Discrete Fourier Transform
IFFT Inverse Fast Fourier Transform
IFWHT Inverse Fast Walsh-Hadamard Transform
MMSE Minimum Mean Square Error
LTE Long Term Evolution
LC Low-Complexity
MUI Multi-User Interference
OFDM Orthogonal Frequency-Division Multiplexing
PACF Periodic Autocorrelation Function
FFT Fast Fourier Transform
FWHT Fast Walsh-Hadamard Transform
SADM Spreading-Allocation Division Multiplexing
SER Symbol Error Rate
ISI Inter-Symbol Interference
PL Partially Loaded
TDMA Time-Division Multiple Access
TDM Time-Division Multiplexing
PAPR Peak-to Average Power Ratio
FEC Forward Error Correction
WLAN Wireless Local Area Network
WPAN Wireless Personal Area Network

The invention claimed is:

1. A method for spreading a plurality of data symbols onto subcarriers of a carrier signal for a transmission in a transmission system, comprising:
   providing a data vector, comprising the plurality of data symbols;
   performing a spreading allocation of the data vector using a spreading allocation matrix to deliver a vector exhibiting a length which corresponds to the number of subcarriers,
   transforming, by a transformer, the delivered vector; and
   after transforming the delivered vector, spreading the transformed data vector using a spreading matrix, to thereby create a spread data vector,
   wherein the spread data vector has a length which corresponds to the number of subcarriers,
   wherein the spreading allocation assigns the data symbols in the data vector to the inputs of a transformer.

2. The method according to claim 1, wherein the spreading matrix comprises a diagonal matrix.

3. The method according to claim 1, wherein the spreading matrix comprises a diagonal matrix, which is defined by a spreading sequence.

4. The method according to claim 3, wherein the spreading sequence comprises a sequence with perfect periodic autocorrelation function (PACF).

5. The method according to claim 4, wherein the spreading sequence comprises one of the following sequences:
   (1) a Frank sequence,
   (2) a Frank-Zadoff-Chu sequence,
   (3) a sequence, which results from the sequences mentioned under (1) and (2) by invariance operations,
   (4) a sequence, which results from the sequences mentioned under (1)-(3) by discrete Fourier transform (DFT) or inverse discrete Fourier transform (IDFT),
   (5) a sequence, which results from the sequences mentioned under (4) by invariance operations.

6. The method according to claim 3, wherein the spreading sequence comprises a sequence with good periodic autocorrelation function (PACF).

7. The method according to claim 6, wherein the spreading sequence comprises one of the following sequences:
(1) a binary m-sequence,
(2) a binary Legendre sequence,
(3) a binary generalized Sidelnikov sequence,
(4) a Twin-Prime sequence,
(5) a Barker sequence,
(6) a quadriphase Legendre sequence,
(7) a quadriphase generalized Sidelnikov sequence,
(8) a quadriphase complement-based sequence,
(9) a quadriphase Lee sequence,
(10) a sequence, which results from the sequences mentioned under (1)-(9) by invariance operations.

8. The method according to claim 1, wherein the spreading allocation matrix comprises the elements 1 and 0, wherein:

$$\sum_{m=1}^{M} [T]_{nm} \in \{0, 1\} \forall n = 1 \dots N$$

applies, so that any of the N parallel inputs of the base spreading module is only allocated one-fold, and $$\sum_{n=1}^{N} [T]_{nm} > 0 \forall m = 1 \dots M,$$

so that all M data symbols are taken into consideration for base spreading, with
M number of data symbols, and
N number of subcarriers.

9. The method according to claim 8, wherein, for the spreading allocation matrix the following applies:

$$\sum_{n=1}^{N} [T]_{nm} = 1 \forall m = 1 \dots M$$

wherein the spreading allocation matrix is composed of a unit matrix and a zero matrix as follows:

$$T_{block} = \begin{pmatrix} I_M \\ 0_{(N-M),M} \end{pmatrix}, \text{ or}$$

wherein the spreading allocation matrix results from an auxiliary matrix as follows:

$$T_{rake} = \begin{pmatrix} T_h \\ 0_{(N-\lfloor \frac{N}{M} \rfloor M),M} \end{pmatrix},$$

with the auxiliary matrix being defined as follows:

$$T_h = I_M \otimes \begin{pmatrix} 1 \\ 0_{(\lfloor \frac{N}{M} \rfloor - 1),1} \end{pmatrix}$$

with:
I unit matrix, and
0 zero matrix.

10. The method according to claim 9, wherein the spreading allocation matrix comprises a cyclically shifted matrix.

11. The method according to claim 1, wherein, in support of K users of the transmission system, one user-specific spreading allocation matrix respectively allocated to a user k is used, where also:

$$\sum_{k=1}^{K} \sum_{m=1}^{M} [T_k]_{nm} \in \{0, 1\} \forall n = 1 \dots N,$$

so that any of the N parallel inputs of the base spreading module is only allocated one-fold, in case of multiple users.

12. The method according to claim 1, comprising:
further processing of the spread data vector by the transmission system.

13. The method according to claim 12, wherein the carrier signal comprises an OFDM signal with N subcarriers, with M coded data symbols being spread onto the N subcarriers, and wherein the provided data vector is being transformed by an inverse discrete Fourier transform.

14. A method for de-spreading of a signal being transmitted in a transmission system, which comprises a plurality of data symbols, which were spread onto subcarriers of a carrier signal by a method according to claim 1, comprising:
providing a receive vector of the length N, which comprises the data symbols; and
de-spreading the provided receive vector by
de-spreading the receive vector, and
applying an inverse spreading allocation matrix for selecting a symbol vector of the length M.

15. The method according to claim 14, wherein the de-spreading comprises a multiplication with the inverse of the base spreading matrix, which is equivalent to the spreading sequence.

16. The method according to claim 15, wherein the base spreading matrix, which is equivalent to the spreading sequence, results as follows:
$C_{eq}=\text{circ}(c_{eq})$, with $$c_{eq} = \frac{1}{\sqrt{N}} Fu = \frac{1}{\sqrt{N}} DFT(u),$$

where F is the discrete Fourier transform (DFT) matrix, and $$\frac{1}{\sqrt{N}}$$

is a scaling factor.

17. A non-transitory computer readable medium including a computer program comprising a program code for implementing the method according to claim 1, when the program code runs on a computer or processor.

18. A non-transitory computer readable medium including a computer program comprising a program code for implementing the method according to claim 14, when the program code runs on a computer or processor.

19. An apparatus for spreading a plurality of data symbols onto subcarriers of a carrier signal for a transmission in a transmission system, the apparatus comprising:
   a serial/parallel converter to provide a data vector comprising the plurality of data symbols;
   a first spreader to perform a spreading allocation of the data vector using a spreading allocation matrix to deliver a vector exhibiting a length which corresponds to the number of subcarriers,
   a transformer to transform the delivered vector; and
   a second spreader to perform, after transforming the delivered vector, a spreading of the transformed data vector using a spreading matrix, to thereby create a spread data vector, wherein
   the spread data vector has a length that corresponds to the number of subcarriers, and
   the spreading allocation assigns the data symbols in the data vector to the inputs of the transformer.

20. An apparatus for de-spreading a signal that comprises a plurality of data symbols spread onto subcarriers of a carrier signal by an apparatus for spreading a plurality of data symbols onto subcarriers of a carrier signal for a transmission, wherein
   the apparatus for spreading comprises: a serial/parallel converter to provide a data vector comprising the plurality of data symbols, a first spreader to perform a spreading allocation of the data vector using a spreading allocation matrix to deliver a vector exhibiting a length which corresponds to the number of subcarriers, a transformer to transform the delivered vector; and a second spreader to perform, after transforming the delivered vector, spreading of the transformed data vector using a spreading matrix, to thereby create a spread data vector, wherein the spread data vector has a length which corresponds to the number of subcarriers, wherein the spreading allocation assigns the data symbols in the data vector to the inputs of the transformer; and
   the apparatus for de-spreading comprises: a serial/parallel converter to provide a receive vector of the length N, which comprises the data symbols, a de-spreader to de-spread the receive vector, and to apply an inverse spreading allocation matrix for selecting a symbol vector of the length M.

21. A transmission system, comprising:
   a transmitter, which comprises an apparatus for spreading a plurality of data symbols onto subcarriers of a carrier signal for a transmission in the transmission system, the apparatus for spreading comprising: serial/parallel converter to provide a data vector comprising the plurality of data symbols, a first spreader to perform a spreading allocation of the data vector using a spreading allocation matrix to deliver a vector exhibiting a length which corresponds to the number of subcarriers, a transformer to transform the delivered vector; and a second spreader to perform, after transforming the delivered vector, spreading of the transformed data vector using a spreading matrix, to thereby create a spread data vector, wherein the spread data vector has a length which corresponds to the number of subcarriers, wherein the spreading allocation assigns the data symbols in the data vector to the inputs of the transformer; and
   a receiver, which comprises an apparatus for de-spreading, the apparatus for de-spreading comprising: a serial/parallel converter to provide a receive vector of the length N, which comprises the data symbols, a de-spreader to de-spread the receive vector, and to apply an inverse spreading allocation matrix for selecting a symbol vector of the length M.

* * * * *